United States Patent
Kellogg

(10) Patent No.: US 11,869,044 B2
(45) Date of Patent: Jan. 9, 2024

(54) METHODS AND SYSTEM TO COMPARE DIFFERENT OPTIONS IN A DECISION MAKING PROCESS

(71) Applicant: Four Charm Technologies, LLC, Birmingham, AL (US)

(72) Inventor: Rawdon W. Kellogg, Guntersville, AL (US)

(73) Assignee: Four Charm Technologies, LLC, Birmingham, AL (US)

( * ) Notice: Subject to any disclaimer, the term of this patent is extended or adjusted under 35 U.S.C. 154(b) by 305 days.

(21) Appl. No.: 17/035,613

(22) Filed: Sep. 28, 2020

(65) Prior Publication Data

US 2021/0082003 A1    Mar. 18, 2021

Related U.S. Application Data

(63) Continuation of application No. 15/447,956, filed on Mar. 2, 2017, now Pat. No. 10,825,063, which is a
(Continued)

(51) Int. Cl.
*G06Q 30/0241* (2023.01)
*G06Q 30/0251* (2023.01)
(Continued)

(52) U.S. Cl.
CPC .......... *G06Q 30/0277* (2013.01); *G06N 5/04* (2013.01); *G06Q 30/0241* (2013.01);
(Continued)

(58) Field of Classification Search
None
See application file for complete search history.

(56) References Cited

U.S. PATENT DOCUMENTS 6,151,565 A * 11/2000 Lobley ............... G06Q 99/00
707/999.005
8,051,023 B2  11/2011 Kellogg et al.
(Continued)

FOREIGN PATENT DOCUMENTS

WO    WO-0152126 A2 *  7/2001  ............. G06Q 30/02

OTHER PUBLICATIONS

Canadian Patent Office, Office Action for Application No. 2,886,794, dated Aug. 14, 2020, 8 pages.
(Continued)

*Primary Examiner* — Alan Chen
(74) *Attorney, Agent, or Firm* — Nutter McClennen & Fish LLP

(57) ABSTRACT

A system, method and computer program product for interfacing a decision engine and a marketing engine in order to provide vendor-related data in response to decision-related data is disclosed. In at least one embodiment, the system and method may include providing a decision engine on a user-accessible network, interfacing a marketing engine with the decision engine on the network; receiving a plurality of user inputs with the decision engine; processing decision-related data with the decision engine in accordance with the plurality of user inputs; sharing the decision-related data with the marketing engine; processing the decision-related data with the marketing engine; and transmitting vendor-related data via the network.

17 Claims, 25 Drawing Sheets

Related U.S. Application Data continuation of application No. 14/582,499, filed on Dec. 24, 2014, now Pat. No. 9,619,820, which is a continuation of application No. 13/632,277, filed on Oct. 1, 2012, now Pat. No. 8,954,367, which is a continuation-in-part of application No. 12/683,758, filed on Jan. 7, 2010, now Pat. No. 8,572,015, which is a continuation-in-part of application No. 12/081,352, filed on Apr. 15, 2008, now Pat. No. 8,065,261, and a continuation-in-part of application No. 12/081,353, filed on Apr. 15, 2008, now Pat. No. 8,051,023.

(60) Provisional application No. 60/935,650, filed on Aug. 23, 2007.

(51) Int. Cl.
*G06Q 30/0601* (2023.01)
*G06N 5/04* (2023.01)
*H04L 67/10* (2022.01)
*G06Q 30/0273* (2023.01)

(52) U.S. Cl.
CPC ..... *G06Q 30/0256* (2013.01); *G06Q 30/0601* (2013.01); *G06Q 30/0627* (2013.01); *G06Q 30/0629* (2013.01); *G06Q 30/0631* (2013.01); *H04L 67/10* (2013.01); *G06Q 30/0275* (2013.01)

(56) References Cited

U.S. PATENT DOCUMENTS

| | | |
|---|---|---|
| 8,572,015 B2 | 10/2013 | Kellogg et al. |
| 9,619,820 B2 | 4/2017 | Kellogg |
| 2005/0192899 A1 | 9/2005 | Reardon |
| 2005/0240580 A1 | 10/2005 | Zamir et al. |
| 2006/0247971 A1 | 11/2006 | Dresden et al. |
| 2006/0282304 A1 | 12/2006 | Bedard et al. |
| 2007/0043632 A1 | 2/2007 | Abelow |
| 2007/0124134 A1 | 5/2007 | Van Kommer |
| 2009/0055337 A1 | 2/2009 | Kellogg et al. |
| 2009/0055338 A1 | 2/2009 | Kellogg et al. |
| 2010/0174585 A1 | 7/2010 | Kellogg et al. |
| 2010/0223211 A1 | 9/2010 | Johnson et al. |
| 2017/0193570 A1 | 7/2017 | Kellogg |

OTHER PUBLICATIONS

European Patent Office, Supplementary European Search Report for Application No. 13779974.8, dated Mar. 8, 2017, 8 pages.

International Searching Authority, International Search Report-International Application No. PCT/US14/023448, dated Dec. 5, 2014, together with the Written Opinion of the International Searching Authority, 13 pages.

Non-Final Office Action for U.S. Appl. No. 17/035,603 dated Oct. 18, 2022 (22 pages).

\* cited by examiner

252

208

NEW DECISIONS | ○ FACTORS ● OPTIONS ○ DATA ○ RESULTS ○ GRAPH RESULTS ○ GRAPH FACTORS

SAVE OR LOAD | POP-UP SUMMARY OF RESULTS AT ANY TIME ● CLEAR ○ SUMMARY

202

YOU CAN TURN ON OR OFF ANY OF THE DECISION POSSIBILITIES BELOW BY USING THE ON/OFF BUTTONS ... OR IF YOU WANT TO ADD YOUR OWN, JUST ERASE ONE OF THESE DECISION OPTIONS AND ENTER YOUR OWN.

258

244 — [ON] (DECISION OPTION A)
[ON] (DECISION OPTION B)
256 — [ON] (DECISION OPTION C)
[ON] (DECISION OPTION D)
[ON] (DECISION OPTION E)
[ON] (DECISION OPTION F)
[ON] (DECISION OPTION G)
[ON] (DECISION OPTION H)
[ON] (DECISION OPTION I)
[ON] (DECISION OPTION J)

○ FACTORS   ○ OPTIONS   ● DATA   ○ RESULTS   ○ GRAPH RESULTS   ○ GRAPH FACTORS

POP-UP SUMMARY OF RESULTS AT ANY TIME   ● CLEAR   ○ SUMMARY

BELOW IS THE DATA PROVIDED BY THE DECISION SYSTEM
YOU MAY CLICK ANY COLUMN HEADER TO SORT UP OR DOWN

|  | DECISION OPTION A | DECISION OPTION B | DECISION OPTION C | DECISION OPTION D |
|---|---|---|---|---|
| FACTOR 1 | 42 | 23 | 32 | 25 |
| FACTOR 2 | 24,777 | 55,000 | 27,000 | 26,500 |
| FACTOR 3 | 600 | 325 | 450 | 387 |
| FACTOR 4 | 7 STARS | 7 STARS | 8 STARS | 6 STARS |
| FACTOR 5 | 8 STARS | 8 STARS | 9 STARS | 9 STARS |
| FACTOR 6 | 14.00 | 14.50 | 13.80 | 13.60 |
| FACTOR 7 | 7.50 | 7.40 | 7.20 | 7.90 |
| FACTOR 8 | 24 | 26 | 27 | 28 |
| FACTOR 9 | NO | YES | YES | YES |
| FACTOR 10 | RED | GREEN | WHITE | BLUE |

FIG. 6

NEW DECISIONS | ⊚FACTORS ⊚OPTIONS ⊚DATA ⊚RESULTS ⊚GRAPH RESULTS ⊚GRAPH FACTORS
SAVE OR LOAD | POP-UP SUMMARY OF RESULTS AT ANY TIME ⦿CLEAR ⊚SUMMARY

RESULTS FOR EACH DECISION POSSIBILITY BASED ON THE IMPORTANCE YOU ASSIGNED TO EACH FACTOR. CLICK COLUMN HEADER TO SORT

|  | DECISION OPTION A | DECISION OPTION B | DECISION OPTION C | DECISION OPTION D |
|---|---|---|---|---|
| FACTOR 1 | 1,000 | 520 | 880 | 600 |
| FACTOR 2 | 22 | 0 | 0 | 0 |
| FACTOR 3 | 500 | 208 | 417 | 312 |
| FACTOR 4 | 175 | 175 | 200 | 150 |
| FACTOR 5 | 200 | 200 | 225 | 225 |
| FACTOR 6 | 125 | 94 | 137 | 150 |
| FACTOR 7 | 31 | 38 | 50 | 6 |
| FACTOR 8 | 250 | 225 | 200 | 175 |
| FACTOR 9 | 0 | 250 | 250 | 250 |
| FACTOR 10 | 250 | 250 | 0 | 250 |
| TOTAL SCORE | 2553 | 1960 | 2359 | 2118 |

FIG. 7

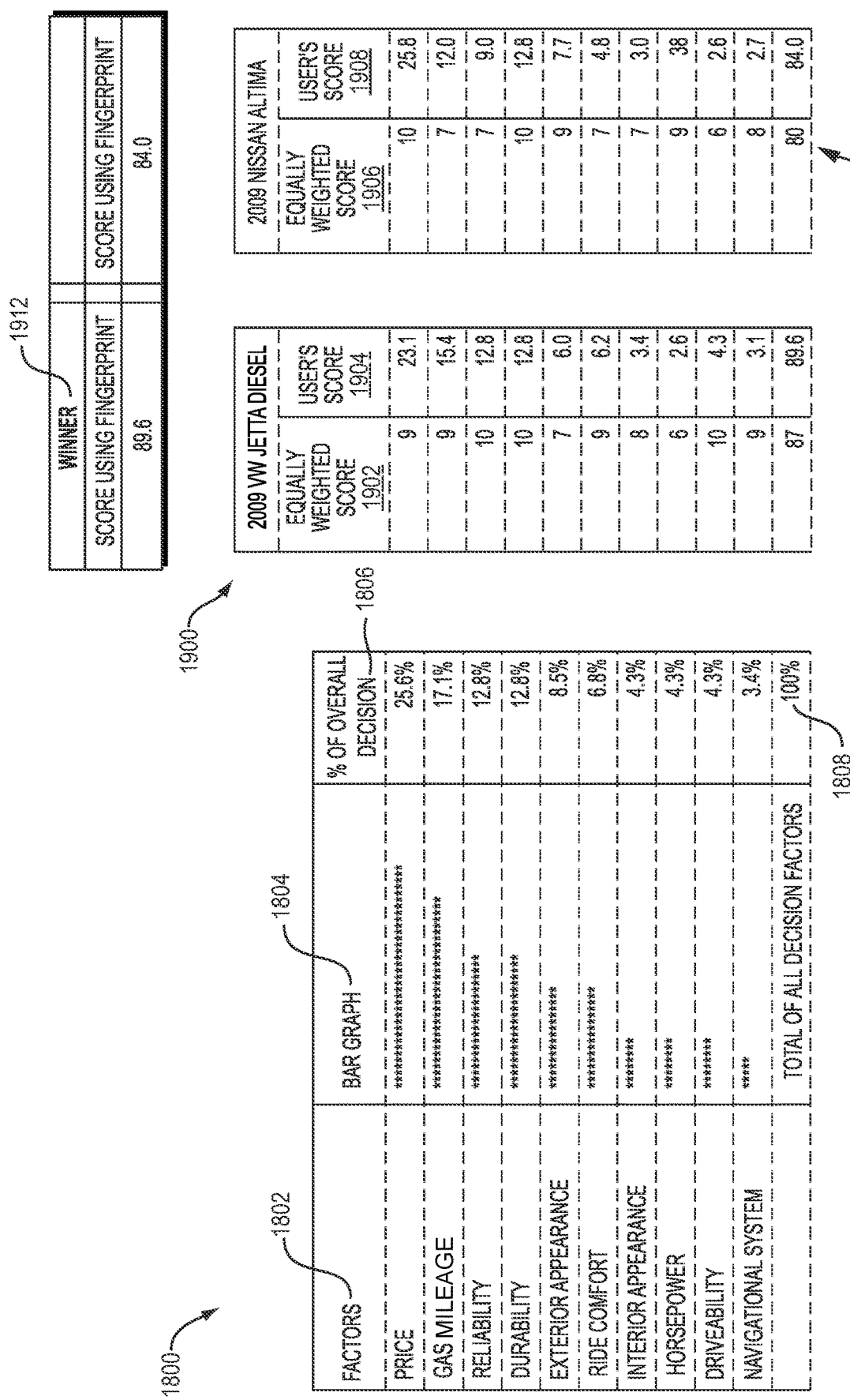
FIG. 18
FIG. 19

| VENDOR FACTORS | VENDOR OPTION A | VENDOR OPTION B | VENDOR OPTION C | VENDOR OPTION D |
|---|---|---|---|---|
| FACTOR 1 | 1,000 | 520 | 880 | 600 |
| FACTOR 2 | 22 | 0 | 0 | 0 |
| FACTOR 3 | 500 | 208 | 417 | 312 |
| FACTOR 4 | 175 | 175 | 200 | 150 |
| FACTOR 5 | 200 | 200 | 225 | 225 |
| FACTOR 6 | 125 | 94 | 137 | 150 |
| FACTOR 7 | 31 | 38 | 50 | 6 |
| FACTOR 8 | 250 | 225 | 200 | 175 |
| FACTOR 9 | 0 | 250 | 250 | 250 |
| FACTOR 10 | 250 | 250 | 0 | 250 |

VENDOR-RELATED DATA 2410a

UN-WEIGHTED VENDOR FACTOR SCORES 2434a

NIKON ADVERTISEMENTS

| IMPORTANCE | YOUR PREFERENCES | ALL ABOUT OUR OPTICAL ZOOM | INSTANT ON CAPABILITY | HI-SPEED STILL PHOTOS | QUALITY YOU CAN DEPEND ON | NIKKOR CAMERA LENSES | NIKON SPORT OPTICS | LEGENDARY PERFORMANCE | RELIABILITY AND DURABILITY | AFFORDABLE QUALITY |
|---|---|---|---|---|---|---|---|---|---|---|
| 10 | PRICE | 0 | 0 | 0 | 0 | 0 | 0 | 0 | 0 | 8 |
| 0 | AMAZON USER RATING | 2 | 2 | 2 | 7 | 0 | 3 | 6 | 6 | |
| 2 | RESOLUTION | 0 | 0 | 0 | 4 | 0 | 8 | 4 | 0 | |
| 10 | LIGHT WEIGHT | 0 | 0 | 0 | 0 | 8 | 0 | 0 | 0 | |
| 3 | VIDEO QUALITY | 2 | 0 | 2 | 8 | 2 | 5 | 7 | 0 | |
| 5 | DISPLAY SIZE | 0 | 0 | 0 | 0 | 2 | 2 | 2 | 0 | |
| 2 | OPTICAL ZOOM | 10 | 0 | 0 | 2 | 7 | 4 | 7 | 0 | |

2400b

VENDOR-RELATED DATA (e.g., MARKETING DATA) 2410b

IMPORTANCE (e.g., WEIGHTINGS) APPLIED TO THE MATCHED VENDOR FACTORS (WEIGHTED VENDOR FACTORS) 2425

2427

MATCHED VENDOR FACTORS 2426b

UN-WEIGHTED VENDOR FACTOR SCORES 2434b

METHODS AND SYSTEM TO COMPARE DIFFERENT OPTIONS IN A DECISION MAKING PROCESS

RELATED APPLICATION(S)

This present application is a continuation of U.S. patent application Ser. No. 15/447,956, filed Mar. 2, 2017, which is a continuation of U.S. patent application Ser. No. 14/582,499, filed Dec. 24, 2014, now U.S. Pat. No. 9,619,820, which is a continuation of U.S. patent application Ser. No. 13/632,277, filed Oct. 1, 2012, now U.S. Pat. No. 8,954,367, which is a continuation-in-part of U.S. patent application Ser. No. 12/683,758, filed Jan. 7, 2010, now U.S. Pat. No. 8,572,015, which is a continuation-in-part of both U.S. patent application Ser. No. 12/081,353, filed Apr. 15, 2008, now U.S. Pat. No. 8,051,023, and U.S. patent application Ser. No. 12/081,352, filed Apr. 15, 2008, now U.S. Pat. No. 8,065,261, which claim the benefit of U.S. Provisional Application No. 60/935,650, filed on Aug. 23, 2007. The entire teachings of the above applications are incorporated herein by reference.

BACKGROUND

Internet searching is a popular way for internet users to collect information about products that they are considering for purchase. Popular web search engines, such as GOOGLE®, YAHOO!® and LIVE SEARCH® (formerly MSN SEARCH®), rely on user-inputted, keyword-based search queries in order to provide links to relevant web pages and web documents arranged in relevancy-ranked lists. Accordingly, users can input search queries in an effort to find web pages and web documents that focus on the category of products or specific products they wish to learn about.

Search engines provide users with the ability to educate themselves about the products of interest to the extent such information is deemed relevant to the user-inputted search queries and is available. Thus, search engines often aid users in making informed decisions regarding purchasing products of interest. Nevertheless, the actual comparison of the products and decision-making processes are left to the users as this is beyond the intended purposes of a search engine.

Popular search engine firms rely on search advertising as a major source of income. The fact that internet users often use search engines with an eye towards purchasing products makes them particularly appealing to advertisers who are attempting to reach their target consumer audience. Since popular internet search engines rely on keywords in providing results, it follows that search advertising is also sold and delivered on the basis of keywords.

Popular search engine firms conduct running auctions to sell advertising space according to the bids received for keywords. Higher demand keywords command higher bid prices. Typically, advertisers are charged based on click-throughs and not merely the display of their advertisements in response to the keywords. Popular search engines thus typically position advertisements on the search result pages based, at least in part, on click-through rates ("CTRs").

SUMMARY

In one aspect, a computer-implemented method of providing vendor-related data in response to decision-related data is provided. The method can include providing a decision engine on a user-accessible network; interfacing a marketing engine with the decision engine on the network; receiving a plurality of user inputs with the decision engine; processing decision-related data with the decision engine in accordance with the plurality of user inputs; sharing the decision-related data with the marketing engine; and transmitting vendor-related data via the network.

In another aspect, a computer program product having a computer storage medium and a computer program mechanism embedded in the computer storage medium for causing a computer to interface a decision engine and a marketing engine is provided. The computer program mechanism can include a first computer code device configured to interface with the decision engine; a second computer code device configured to interface with the marketing engine; and a third computer code device configured to facilitate data sharing between the decision engine and the marketing engine.

In yet another aspect, a system for providing vendor-related data in response to decision-related data is provided. The system can include one or more servers on a network; a decision engine provided on the one or more servers, the decision engine connected to one or more storage devices for storing, at least in part, decision-related data; a marketing engine provided on the one or more servers, the marketing engine connected to the one or more storage devices for storing, at least in part, vendor-related data; an interfacing application tying the marketing engine to the decision engine, the interfacing application on the one or more servers, wherein the interfacing application is capable of facilitating data sharing between the decision engine and the marketing engine; and wherein the decision engine is capable of serving a plurality of client computing devices on a user-accessible portion of the network.

An embodiment of the present disclosure is a computer-implemented method for providing vendor-related data. The method comprises receiving modified decision-related data from a decision engine. The modified decision-related data is generated by the decision engine by applying at least one user input to decision-related data, wherein the decision-related data is at least one factor used as a criteria in selecting at least one decision option. The at least one decision option is an output of the decision engine in response to the application of the at least one user input to the decision-related data.

In addition, the embodiment retrieves vendor-related data from a marketing database based on one or more properties of the modified decision-related data. The retrieving includes matching the at least one factor to at least one vendor factor associated with the vendor-related data and obtaining vendor-related data associated with at least a subset of the at least one vendor factor. The at least one vendor factor is a criteria used in selecting the vendor-related data.

Also, the embodiment processes the modified decision-related data to modify the at least one vendor factor and selects a subset of the vendor-related data based on the modified at least one vendor factor.

The embodiment may provide the selected subset of vendor-related data to the user. The embodiment may also trigger a marketing engine associated with the marketing database to provide the selected subset of vendor-related data to the user. Additionally, the embodiment may provide the selected subset of vendor-related data to a marketing engine associated with the marketing database as a recommendation of vendor-related data to provide to the user. The marketing engine utilizes the recommendation to provide vendor-related data to the user.

The modified decision-related data may include at least one factor having a weighted score, where the weighted score of the at least one factor is determined by at least an importance assigned to the at least one factor by the user.

The embodiment may retrieve the vendor-related data by selecting the marketing database corresponding to a vendor and retrieving the vendor-related data from the selected at least one marketing database.

The embodiment may select the marketing database corresponding to the vendor by selecting the vendor based on whether or not goods and/or services provided by the vendor correspond to the decision-related data.

Also, the embodiment may process the modified decision-related data by ranking the vendor-related data by applying weighted scores associated with the decision-related data to the vendor factors and selecting a subset of the ranked vendor-related data. Further, the embodiment may select the subset of ranked vendor-related data by selecting the subset based on an advertisement subscription of a vendor associated with the vendor-related data. In addition, the embodiment may provide the vendor-related data to the user by presenting the vendor-related data along with at least one decision option. The at least one decision option is presented to the user by the decision engine utilizing the modified decision-related data. The at least one decision option may be product and/or service related data.

Another embodiment of the present disclosure is a system for providing vendor-related data. The system comprises one or more processors on a network. The system also comprises an interface, provided on the one or more processors, configured to receive modified decision-related data from a decision engine. The modified decision-related data is generated by the decision engine by applying at least one user input to decision-related data. The decision-related data is at least one factor used as a criteria in selecting at least one decision option. The at least one decision option is an output of the decision engine in response to the application of the at least one user input to the decision-related data.

The system also comprises a retrieving module, provided on the one or more processors, configured to retrieve vendor-related data from a marketing database based on one or more properties of the modified decision-related data. The retrieving module is further configured to match the at least one factor to at least one vendor factor associated with the vendor-related data and obtain vendor-related data associated with at least a subset of the at least one vendor factor. The at least one vendor factor is a criteria used in selecting the vendor-related data.

In addition, the system comprises a selection module, provided on the one or more processors, configured to process the modified decision-related data to modify the at least one vendor factor. The selection module is further configured to select a subset of the vendor-related data based on the modified at least one vendor factor.

The interface may be further configured to provide the selected subset of vendor-related data to the user. The interface may also be further configured to trigger a marketing engine associated with the marketing database to provide the selected subset of vendor-related data to the user. Also, the interface may be further configured to provide the selected subset of vendor-related data to a marketing engine associated with the marketing database as a recommendation of vendor-related data to provide to the user, the marketing engine utilizing the recommendation to provide vendor-related data to the user.

The modified decision-related data includes at least one factor having a weighted score, the weighted score of the at least one factor determined by at least an importance assigned to the at least one factor by the user.

The retrieving module may be further configured to select the marketing database corresponding to a vendor and retrieve the vendor-related data from the selected at least one marketing database. The retrieving module may also be further configured to select the vendor based on whether or not goods and/or services provided by the vendor correspond to the decision-related data.

The selecting module may include a ranking module configured to rank the vendor-related data by applying weighted scores associated with the decision-related data to the vendor factors. The selecting module may be further configured to select a subset of the ranked vendor-related data. Also, the selecting module may be further configured to select the subset of the ranked vendor-related data based on an advertisement subscription of a vendor associated with the vendor-related data.

The system may further comprise a presenting module configured to provide the vendor-related data along with at least one decision option. The at least one decision option is presented to the user by the decision engine utilizing the modified decision-related data. The at least one decision option may be product and/or service related data.

Yet another example embodiment is a computer-implemented method for providing vendor-related data. The method comprises receiving modified decision-related data from a decision engine. The modified decision-related data is generated by the decision engine by applying at least one user input to decision related data. The method also comprises retrieving vendor-related data from a marketing database based on one or more properties of the modified decision-related data. Also, the method comprises processing the modified decision-related data to modify at least one vendor factor associated with the retrieved vendor-related data and selecting a subset of the retrieved vendor-related data based on the modified at least one vendor factor.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 5 is an illustration of a decision options page that may be used with the system shown in FIG. 1.

FIG. 6 is an illustration of a raw data page that may be used with the system shown in FIG. 1.

FIG. 7 is an illustration of a score results page that may be used with the system shown in FIG. 1.

FIG. 18 is an exemplary diagram of a score based upon factors of a user.

FIG. 19 is another exemplary diagram of a score based upon factors of a user.

FIGS. 24A-D are tables illustrating decision logic utilized by a connector engine in accordance with an example embodiment of the present disclosure.

DETAILED DESCRIPTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

Figure 1:
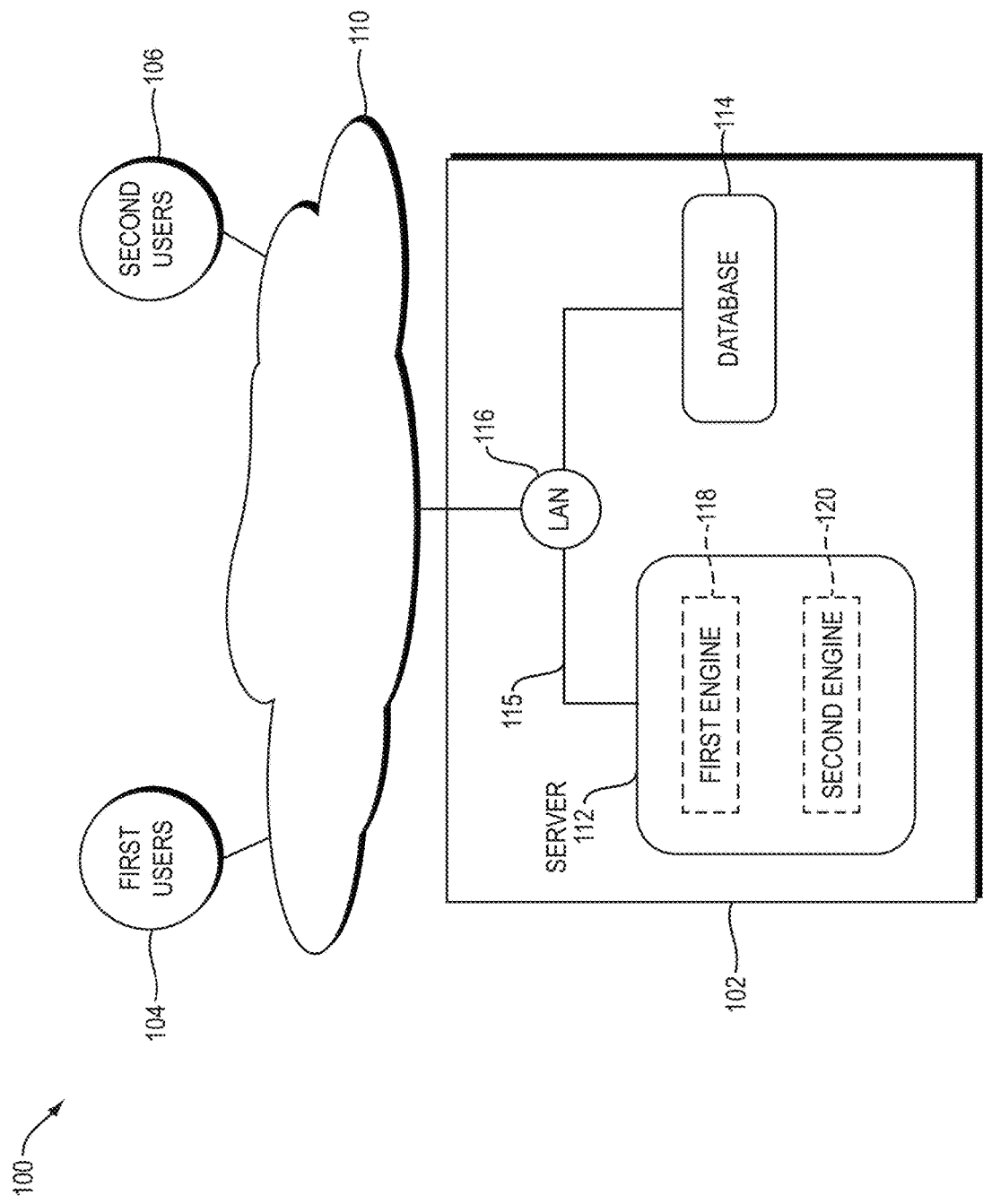
FIG. 1 is a schematic illustration of a decision making and response system.
Figure 2:
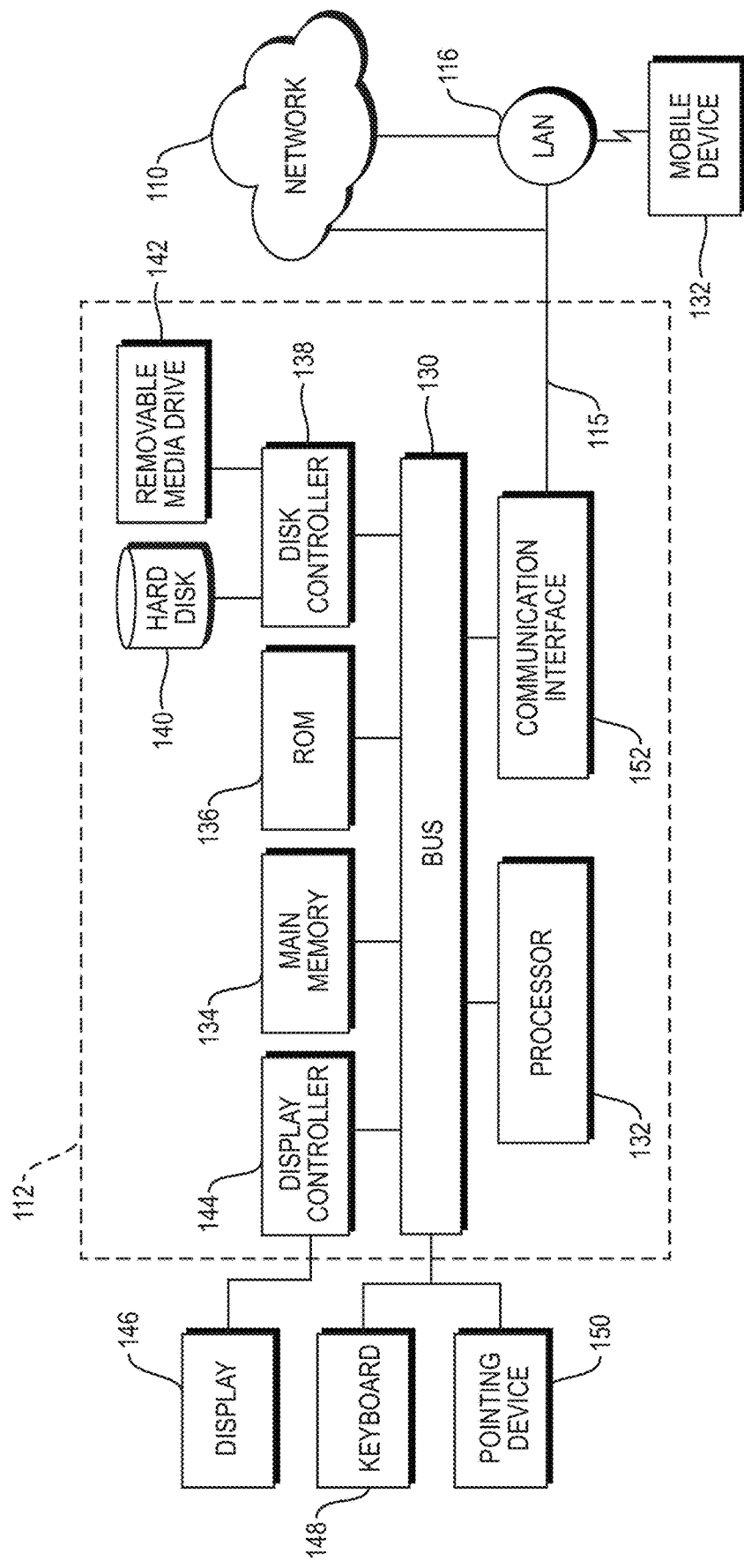
FIG. 2 is an enlarged schematic illustration of the system shown in FIG. 1.

FIG. 1 is a schematic illustration of a decision making and response system 100. FIG. 2 is an enlarged schematic illustration of system 100. In the exemplary embodiment, system 100 may include a web portal 102, at least one first user 104 and at least one second user 106. In the exemplary embodiment, each first user 104 and each second user 106 may be coupled in communication to web portal 102 using a network 110. In the exemplary embodiment, network 110 may be the Internet. In an alternative embodiment, network 110 may be a local area network (LAN), a wireless LAN, a wide area network (WAN) and/or any other type of connection that enables system 100 to function as described herein. System 100, in the exemplary embodiment, may also include at least one server 112 and at least one database 114. In the exemplary embodiment, server 112 may be coupled in communication to database 114 using a network connection 115 that is coupled to a local network 116 such as, but not limited to, a LAN, a wireless LAN, a WAN and/or any other connection that enables system 100 to function as described herein.

In the exemplary embodiment, first users 104 may be any entity that desires to make a decision on a plurality of decision options using at least one factor. Each factor represents a specific consideration that a user may take into account when selecting the decision option. System 100 may be used with decision analyses including, but not limited to, the purchase of any type of products or services, the purchase of any type of real estate, determining which school to attend, determining which career path to pursue or any other decision. In one embodiment, first users 104 may be the general public. Second users 106 may be any entity that is interested in the decision analysis conducted by first users 104. In one embodiment, second users 106 may be any entity that desires to advertise decision options to first users 104. In another embodiment, second users 106 may include, but not limited to, advertising agencies, advertisers and specific product entities.

In the exemplary embodiment, server 112 may include at least one engine 118 programmed therein. Alternatively, a plurality of servers 112 may be used, wherein each server 112 may include at least one engine 118 programmed therein. As used herein, the term "engine" may refer to a collection of logic and/or code that may be executed on server 112 or any other type of device or processor that is capable of producing a response. In the exemplary embodiment, first engine 118 may be a decision engine. In one embodiment, server 112 may include a second engine 120 that may be a connector engine and a third engine 122 that may be a response engine, such as an advertising/marketing engine. In another embodiment, server 112 may include any type of engines or any number of engines that enable system 100 to function as described herein.

In the exemplary embodiment, the term "server" is not limited to just those integrated circuits referred to in the an as a computer, but broadly refers to a processor, a microcontroller, a microcomputer, a programmable logic controller, an application specific integrated circuit and other programmable circuits. These aforementioned terms may be used interchangeably herein. In the exemplary embodiment, server 112 may include a bus 130 or other communication mechanism for communicating information, and a processor 132 coupled with bus 130 for processing the information. In one embodiment, a plurality of processors 132 may be arranged in a multi-processor arrangement to facilitate faster processing as compared to a single processor arrangement. In the exemplary embodiment, system 100 may also include a main memory 134, such as a random access memory (RAM) or other dynamic storage device (e.g., dynamic RAM (DRAM), static RAM (SRAM) and synchronous DRAM (SDRAM)) coupled to bus 130 for storing information and instructions to be executed by processor 132. In addition, main memory 134 may be used for storing temporary variables or other intermediate information during the execution of instructions by processor 132. System 100 may further include a read only memory (ROM) 136 or other static storage device (e.g., programmable ROM (PROM), erasable PROM (EPROM) and electrically erasable PROM (EEPROM)) coupled to bus 130 for storing static information and instructions for processor 132.

System 100 may also include a disk controller 138 coupled to bus 130 to control one or more storage devices for storing information and instructions. In the exemplary embodiment, storage devices may include, but not limited to, a magnetic hard disk 140 and a removable media drive 142 (e.g., floppy disk drive, read-only compact disc drive, read/write compact disc drive, compact disc jukebox, tape drive and removable magneto-optical drive). The storage devices may be coupled to system 100 using any appropriate device interface known to one having ordinary skill in the art (e.g., small computer system interface (SCSI), integrated device electronics (IDE), enhanced-IDE (E-IDE), direct memory access (DMA), or ultra-DMA). System 100 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

In the exemplary embodiment, main memory 134, hard disk 140 and removable media drive 142 are examples of computer-readable mediums that facilitate holding instructions programmed according to the teachings of the invention, data structures, tables, records and/or other data described herein. The term "computer-readable medium" or "computer-readable media" as used herein refers to any medium that facilitates storing and/or providing instructions to processor 132 for the execution thereof. The computer-readable media may include, but not limited to, non-volatile media, volatile media and transmission media. Non-volatile media may include, but not limited to, hard disks, floppy disks, tape, magneto-optical disks, PROMs (EPROM, EEPROM, flash EPROM), DRAM, SRAM, SDRAM or any other magnetic medium. Moreover, non-volatile media may also include compact discs (e.g., CD-ROM) or any other optical medium. Further, non-volatile media may include punch cards, paper tape or other physical medium with patterns of holes. Volatile media may include dynamic memory, such as main memory 134. Transmission media may include coaxial cables, copper wire and fiber optics, including the wires that make up bus 130. Transmission media may also include carrier waves such as acoustic or light waves that may be generated using radio waves and infrared data communications.

In the exemplary embodiment, the computer-readable media may include software that facilitates controlling system 100. Such software may include, but is not limited to, device drivers, operating systems, development tools and applications software. Such computer-readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

In the exemplary embodiment, system 100 may further include a display controller 144 coupled to bus 130 to control a display 146, such as a cathode ray tube (CRT), liquid crystal display (LCD) or any other type of display to facilitate displaying information to a computer user. System 100 may include a plurality of input devices, such as a keyboard 148 and a pointing device 150, to facilitate interacting with the computer user and providing information to processor 132. Alternatively, a touch screen may be used in conjunction with display 146. In one embodiment, pointing device 150 may be a mouse, a trackball or a pointing stick for communicating direction information and command selections to processor 132 and for controlling cursor movement on display 146. In addition, a printer (not shown) may be coupled to system 100 to facilitate printing data stored and/or generated by system 100.

System 100 also includes a communication interface 152 coupled to bus 130, wherein communication interface 152 may be coupled in communication to LAN 116 or network 110 using network connection 115. In one embodiment, communication interface 152 may be a network interface card that is coupled in communication to any packet switched LAN. In another embodiment, communication interface 152 may be an asymmetrical digital subscriber line (ADSL) card, an integrated services digital network (ISDN) card or a modem to facilitate providing a data communication connection to network connection 115. In yet another embodiment, wireless connections may be used to couple communication interface 152 to LAN 116 and/or network 110. In the exemplary embodiment, communication interface 152 sends and receives electrical, electromagnetic or optical signals that carry digital data to and from system 100, which are exemplary forms of carrier waves that facilitate transporting information. Network connection 115 facilitates providing data communication between web portal 102 and data devices using networks 116 and 130. Specifically, network connection 115 may couple first users 104 and/or second users 106 to web portal 102 using at least one of local network 116 and network 110. System 100 may also transmit and receive data, including program code, through networks 116 and 110 using network connection 115 and communication interface 152. Moreover, network connection 115 may couple server 112 in communication to a mobile device 132 such as a personal digital assistant (PDA), a laptop computer, a cellular telephone, a smart phone, an ultra-compact mobile device or any other mobile device that enables system 100 to function as described herein.

During operation, system 100 may perform a portion or all of the processing steps of the invention in response to processor 132 executing one or more sequences of one or more instructions contained within main memory 134 and/or other forms of computer-readable media. In one embodiment, processor 132 may execute the instructions contained within the computer-readable media. In another embodiment, hard-wired circuitry may be used in place of or in combination with the instructions. Thus, the exemplary embodiments described herein are not limited to any specific combination of hardware circuitry and software. For example, the instructions may initially be carried on a magnetic disk of a remote computer. The remote computer can load the instructions for implementing all or a portion of the present invention remotely into a dynamic memory and send the instructions over a telephone line using a modem. A modem local to system 100 may receive the data on the telephone line and use an infrared transmitter to convert the data to an infrared signal. An infrared detector coupled to bus 130 can receive the data carried in the infrared signal and place the data on bus 130. Bus 130 carries the data to main memory 134, from which processor 132 retrieves and executes the instructions. The instructions received by main memory 134 may optionally be stored on hard disk 140 or removable media drive 142 either before or after execution by processor 132.

Other aspects of the invention may include data transmission and Internet-related activities. See Gralla, Preston, How the Internet Works, Ziff-Davis Press (1996), which is hereby incorporated by reference into this patent application. Still other aspects of the invention may utilize wireless data transmission, such as those described in U.S. Pat. Nos. 6,456,645, 5,818,328 and/or 6,208,445, all of which are hereby incorporated by reference into this patent application.

Figure 3:
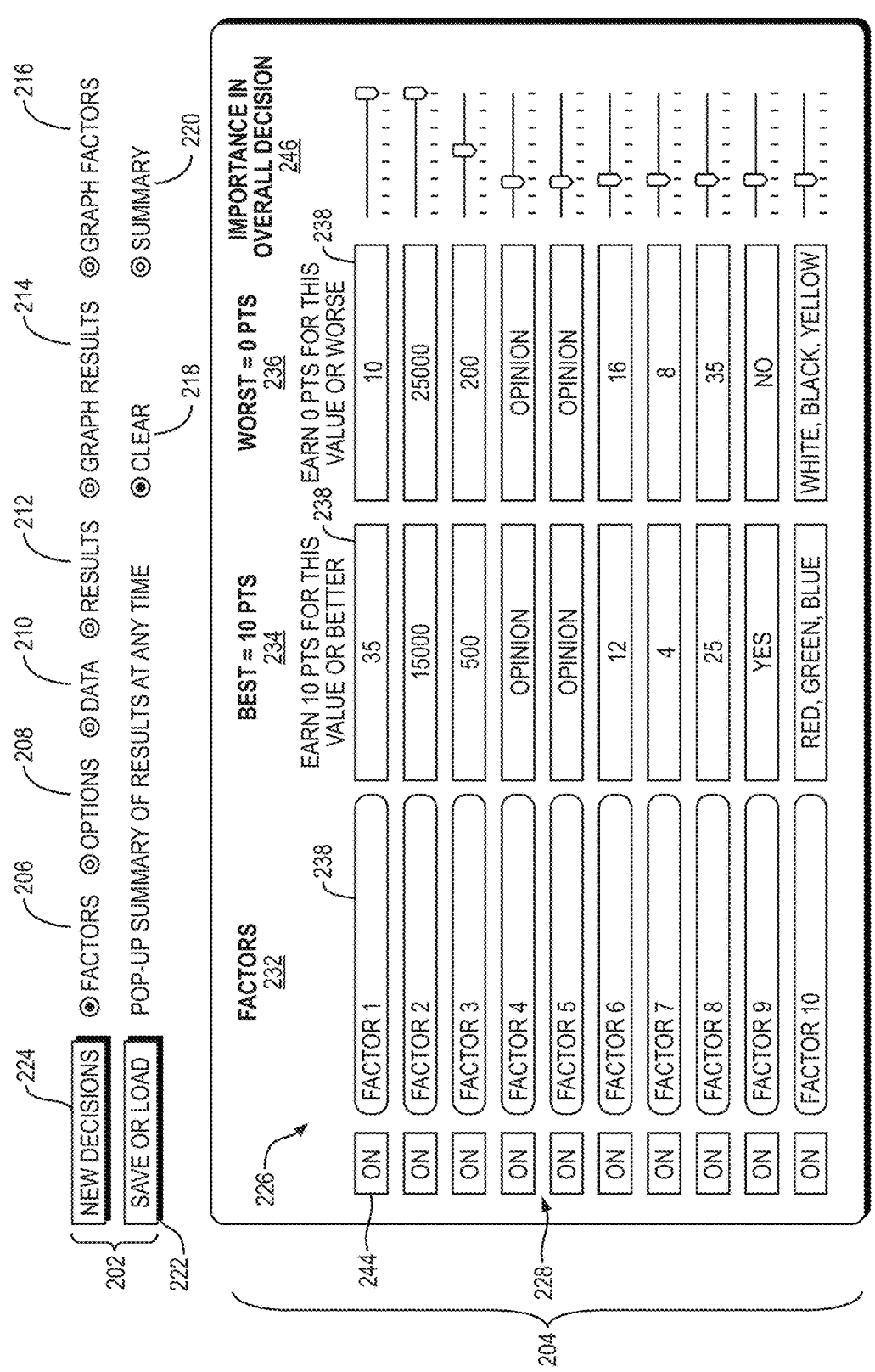
FIG. 3 is an illustration of a factors data entry page that may be used with the system shown in FIG. 1.

FIG. 3 is an illustration of a factors data entry interface page, or factors page 200 that may be used with engine 118. It should be understood that the following description is a non-limiting example pertaining to an exemplary decision engine. In the exemplary embodiment, factors page 200 includes a navigation area 202 and a factor data area 204. Navigation area 202 includes a plurality of radio buttons such as, but not limited to, a factors button 206, an options button 208, a data button 210, a results button 212, a graph results button 214, a graph factors button 216, a clear button 218 and a summary button 220. Each radio button facilitates directing a user to the respective interface page. In the exemplary embodiment, clear button 218 facilitates hiding a score summary pop-up window 294 (shown in FIG. 9) and summary button 220 facilitates displaying score summary pop-up window 294 on the page. Moreover, navigation area 202 may include a save/load button 222 and a new decisions button 224. In the exemplary embodiment, save/load button 222 enables the user to either save their decision analysis progress or load a previously saved decision analysis. Additional information may be included when the user saves their results, such as the ability to choose a destination to save a file to, the ability to name the file to be saved and the ability to include a description of the results. Additionally, engine 118 may allow the user to load saved decision analyses as well as delete prior saved results. Moreover, new decisions button 224 enables the user to begin a new decision analysis.

Factor data area 204 may include a plurality of data columns 226 and at least one data row 228. The plurality of data columns 226 may include, but not limited to, a factors column 232, a first data column 234 and a second data column 236, wherein each column 232, 234 and 236 includes at least one data entry field 238. Each data row 228 may include an ON/OFF toggle button 244, an importance indicator 246 and at least one data entry field 238 associated with columns 232, 234 and 236. In the exemplary embodiment, each ON/OFF button 244 facilitates including or excluding the associated data row 228 from the decision analysis performed by engine 118. Moreover, each importance indicator 246 facilitates indicating the importance of the associated factor that is assigned by the user. In the exemplary embodiment, an aspect of each factor may be indicated in at least one of first and second data columns 234 and 236. Specifically, in one embodiment, an aspect of each factor may be indicated with a range of values. In another embodiment, an aspect of each factor may be indicated as a subjective assessment. In yet another embodiment, an aspect of each factor may be indicated as at least one of a yes/no answer, a true/false answer, a multiple-choice answer, numerical data and any other type of entry known by one having ordinary skill in the art. For example, in the event that each factor may be quantified, a most desired value may be entered into first data column 234 and a least desired value may be entered into second data column 236. In the event that each factor may be represented as a subjective assessment, the user may enter the word "opinion" in at least one of first and second columns 234 and 236. In the event that each factor may be represented as yes/no or true/false entry, the user may indicate the most desired entry in first data column 234 and the least desired entry in second data column 236.

Figure 4:
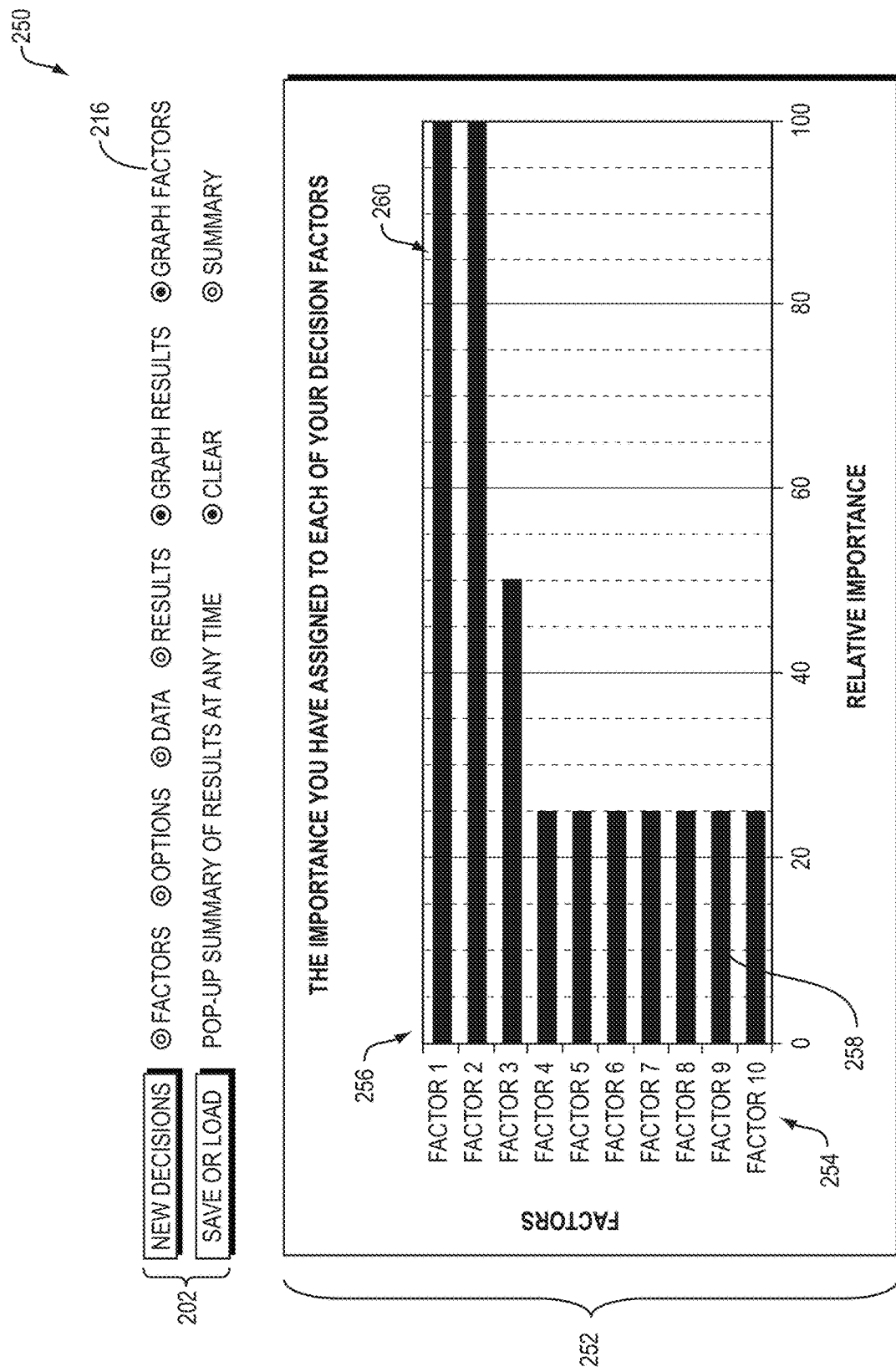
FIG. 4 is an illustration of a graph factors page that may be used with the system shown in FIG. 1.

FIG. 4 is an illustration of a graph factors page 250. In the exemplary embodiment, the user may navigate to graph factors page 250 by clicking graph factors radio button 216 in navigation area 202 included in graph factors page 250. Graph factors page 250 may also include a display area 252 that may include a chart 254 that graphically represents the importance of each factor assigned by the user using importance indicator 246. Specifically, chart 254 includes a y-axis 256 that includes each factor used in the decision process and an x-axis 258 that includes the relative importance of each factor. At least one graph bar 260 is associated with each factor such that graph bar 260 may graphically represent the importance of each factor. Moreover, the relative importance of each factor is displayed by importance percentage basis. In an alternative embodiment, display area 252 may display the factor importance as a pie chart, a list or any other method of displaying information known to one having ordinary skill in the art to enable engine 118 to function as described herein.

FIG. 5 is an illustration of a decision options page 252. In the exemplary embodiment, the user may navigate to decision options page 252 by clicking options radio button 208 in navigation area 202 included in decision options page 252. Decision options page 252 may also include a decision options area 254 that may include at least one data row 256 that may include a decision option 258 and at least one ON/OFF toggle button 244 associated therewith. In the exemplary embodiment, and described in more detail below, engine 118 may determine at least one decision option 258 based on the factors entered by the user in factors page 200. In one embodiment, the user may indicate a broad category of the desired decision options 258 to which each factor may apply. In another embodiment, engine 118 may automatically determine the decision option 258 category that applies based on the factors entered by the user in factors page 200. In yet another embodiment, the user may enter a plurality of decision options 258 and at least one factor into system 100 to enable engine 118 to decide on an appropriate decision option 258 based on the entered decision options 258 and factors.

FIG. 6 is an illustration of a raw data page 260. In the exemplary embodiment, the user may navigate to data page 260 by clicking data radio button 210 in navigation area 202 included within data page 260. Data page 260 may also include a data display area 262 that may include at least one data matrix 264. Specifically, data matrix 264 may include at least one data column 266 associated with each decision option 258 determined by engine 118. Moreover, data matrix 264 may include at least one data row 268 associated with each factor entered by the user. In the exemplary embodiment, as described in more detail below, engine 118 determines the objective score or rating for each factor for each decision option 258 and displays the values in matrix form. In the exemplary embodiment, each factor score is non-weighted. As a result, data page 260 displays the raw data to the user. For example, as described in more detail below, in the event the factor score may be quantified, a numeric value is displayed. In the event the factor value is an opinion, the value may be displayed as a subjective assessment using a percent scale. For example, a subjective assessment may be displayed as 8 stars out of 10 stars, as described in more detail below. Further, in the event the factor value may be displayed as a yes/no answer or true/false answer, such an answer is displayed. Moreover, in the event the factor score is a multiple choice answer, a single answer choice that applies to the decision option is displayed. For example, if the factor is a color, then the factor score may be indicated as the specific color of the specific decision option.

FIG. 7 is an illustration of a score results page 270. In the exemplary embodiment, the user may navigate to results page 270 by clicking results radio button 212 in navigation area 202 included within results page 270. Results page 270 may also include a data display area 272 that may include at least one data matrix 274. Specifically, data matrix 274 may include at least one data column 276 associated with each decision option 258 determined by engine 118. Moreover, data matrix 264 may also include at least one data row 278 associated with each factor entered by the user. In the exemplary embodiment, as described in more detail below, engine 118 determines the weighted score of each factor using the non-weighted factor score and the importance assigned to the factor by the user. Each weighted factor score for each decision option 258 is displayed in matrix form. In the exemplary embodiment, each weighted factor score is a numeric number that is used to determine a total score for each decision option 258.

Figure 8:
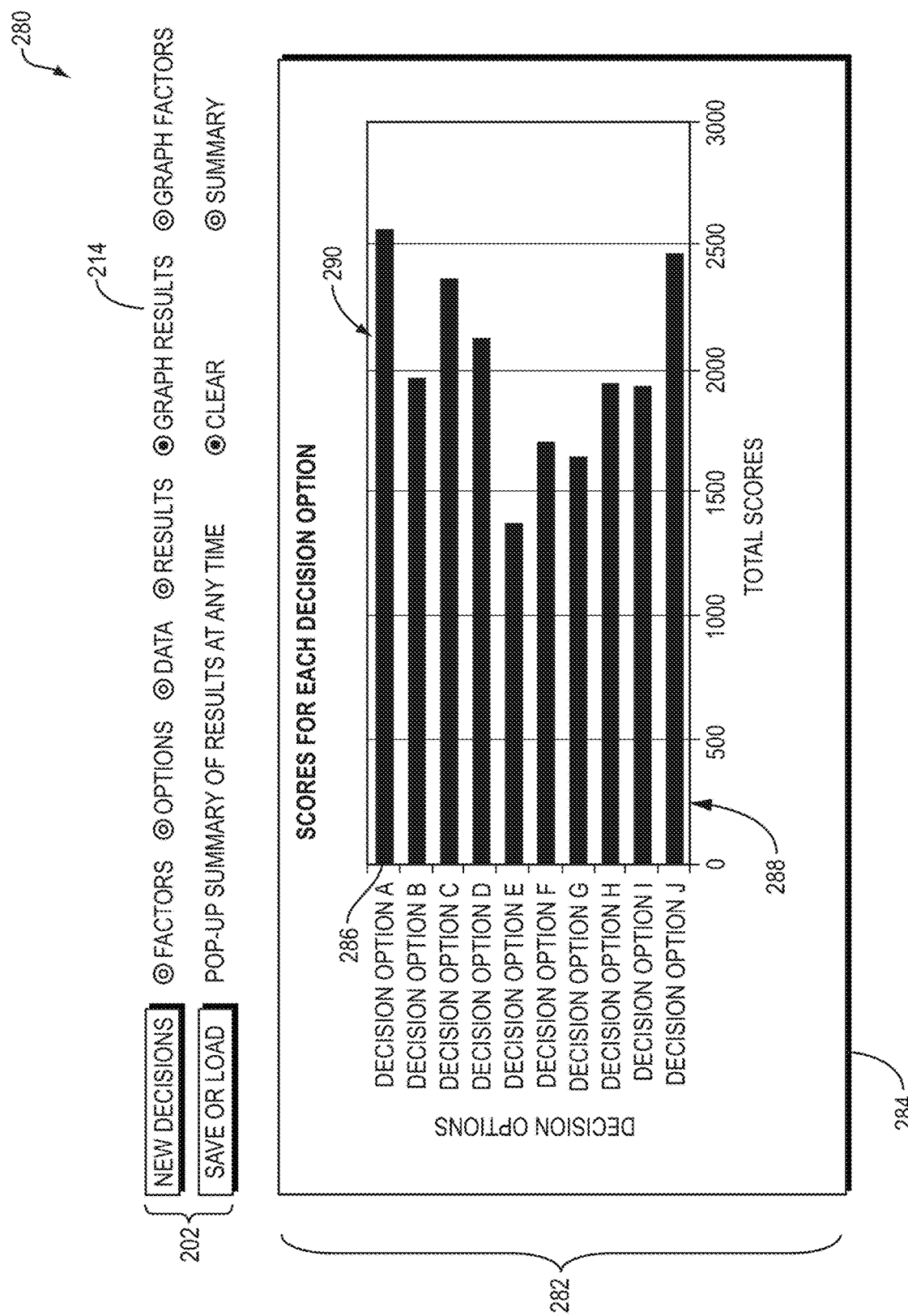
FIG. 8 is an illustration of a graph results page that may be used with the system shown in FIG. 1.

FIG. 8 is an illustration of a graph results page 280. In the exemplary embodiment, the user may navigate to graph results page 280 by clicking graph results radio button 214 in navigation area 202 included in graph results page 280. Graph results page 280 may also include a display area 282 that may include a chart 284 that graphically represents the score of each decision option 258 determined by engine 118. Specifically, chart 284 includes a y-axis 286 that includes at least one decision option 258 compared by engine 118 and an x-axis 288 that includes the total scores of each decision option 258. A graph bar 290 is associated with each decision option 258 such that graph bar 290 may graphically represent the total score each decision option 258. In an alternative embodiment, display area 282 may display the total score as a pie chart, a list or any other method of displaying information known to one having ordinary skill in the art to enable system 100 to function as described herein.

Figure 9:
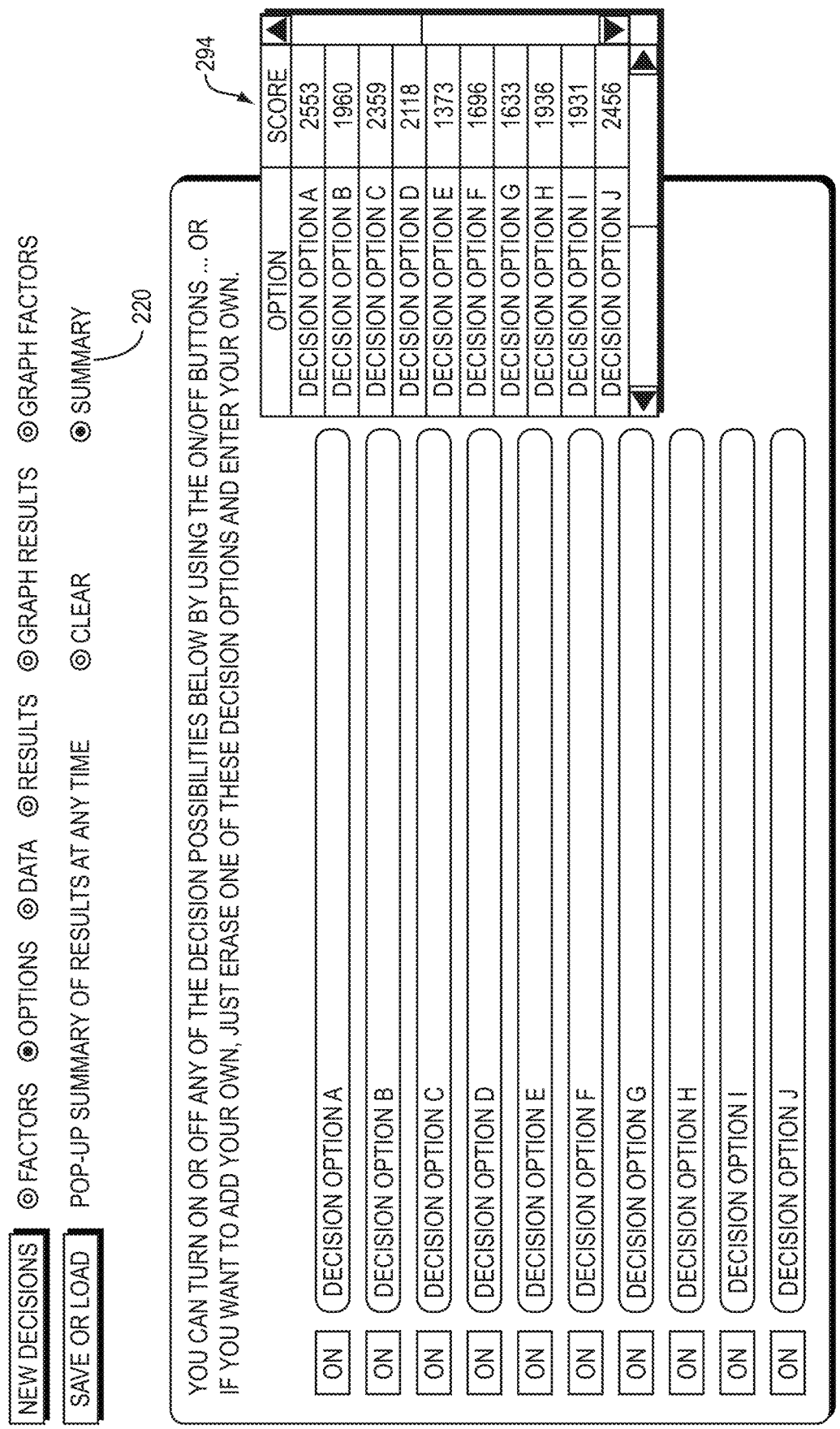
FIG. 9 is an illustration of a page including a pop-up summary window that may be used with the system shown in FIG. 1.

In the exemplary embodiment, once the score for each decision option 258 is determined by engine 118, as shown in FIG. 9, the user may click on summary button 220 to display score summary pop-up window 294 on any page. Score summary pop-up window 294 may include a list of the compared decision options 258 and the scores associated with each decision option 258.

Figure 10:
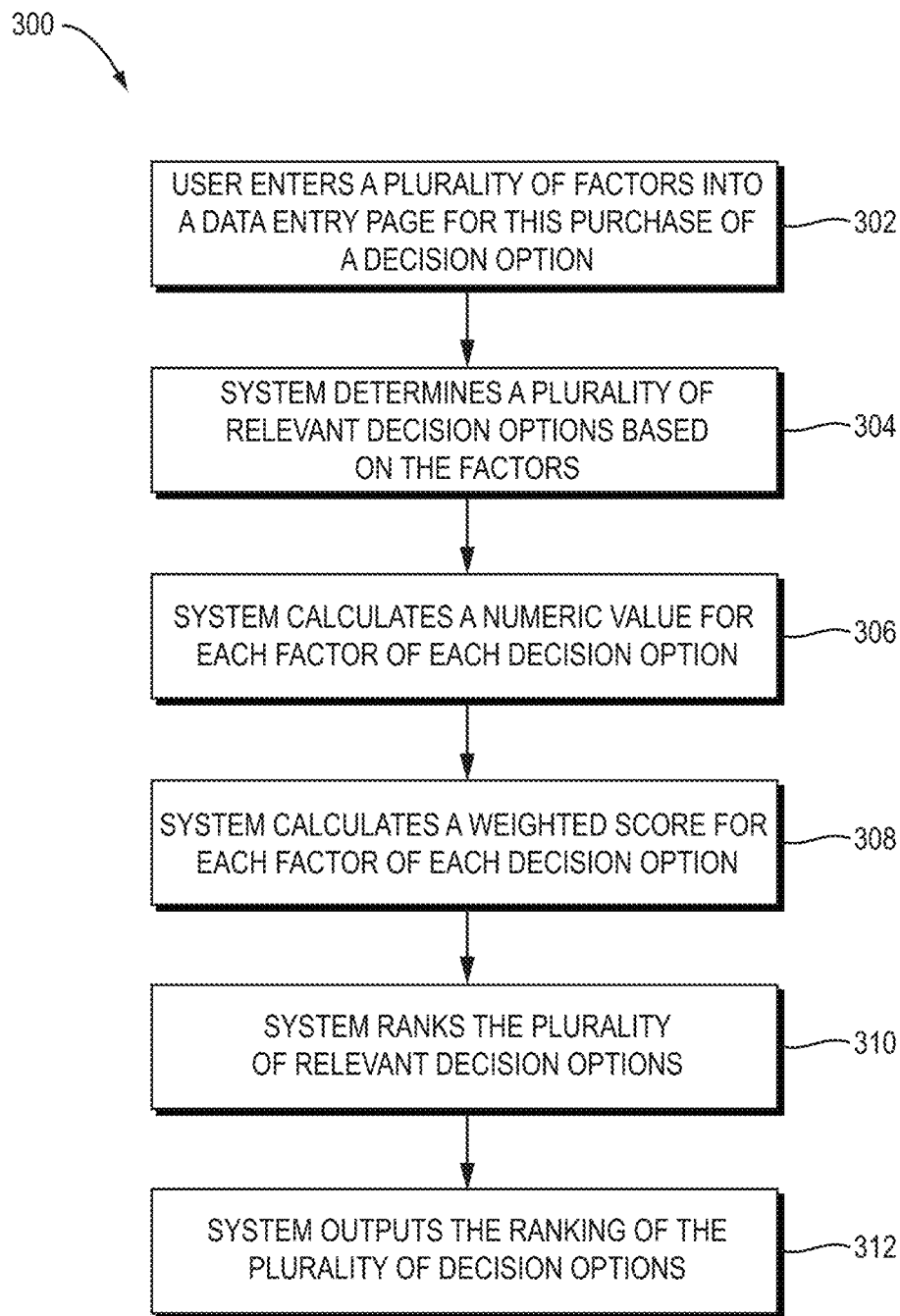
FIG. 10 is a flowchart of a method of comparing different options using the system shown in FIG. 1.

FIG. 10 is a flow chart of exemplary method 300 of comparing different options using system 100. During operation, a user desiring to decide on a decision option may utilize system 100, and more specifically engine 118, to facilitate determining which decision option to choose. In one embodiment, system 100 may be utilized or implemented on network 110, such as, but not limited to, the Internet. Engine 118 may be used with decision analyses including, but not limited to, the purchase of any type of products or services, the purchase of any type of real estate, deciding which school to attend, deciding which career to pursue or any other type of decision analysis. In the exemplary embodiment, the user may begin a new decision analysis by clicking new decisions button 224 in any of the pages shown in FIGS. 3-9. In method step 302, the user may then navigate to factors page 200, as shown in FIG. 3, by clicking factors radio button 206, wherein the user may enter a plurality of factors, corresponding to various aspects of the desired decision option, into factors column 232. Moreover, the user may enter specific data for each factor into first data column 234 and/or second data column 236. The factor data may be quantified by engine 118 according to an importance level assigned to each factor by the user using importance indicator 246. In method step 304, once the user has entered the plurality of factors, the factor data and assigned the importance level of each factor, engine 118 may determine a plurality of decision options 258 to be analyzed and compared in the decision analysis, as shown in FIG. 4.

Although engine 118 may be used with any decision analysis, a non-limiting example pertaining to deciding which automobile the user should purchase is used to describe the operation of engine 118. In this non-limiting example, engine 118 may analyze and compare various aspects of automobiles to enable the user to make a decision on which automobile to purchase. Specifically, the plurality of factors may represent various aspects of automobiles that the user may use to analyze and compare potential automobiles. For example, factors 1-10 shown in FIG. 3 may represent, miles per gallon (MPG), cost, miles per tank, interior noise level, appearance, quarter mile time, 0-60 miles per hour (MPH) time, turning radius, anti-lock braking system (ABS) and exterior color, respectively. Once the user enters the plurality of automobile factors into factors column 232 in factors page 200, the user may enter unique factor data for each factor in at least one of first and second columns 234 and 236.

In the non-limiting vehicle purchasing example, the unique factor data may represent aspects of a potentially acceptable automobile that the user would purchase. In the exemplary embodiment, at least one factor may be represented as a range. For example, the user may be interested in an automobile that can travel between a range of about 10 to about 35 miles per gallon and cost between a range of about $15,000 to about $25,000. Moreover, at least one other factor may be represented as a subjective assessment, a yes/no answer, a true/false answer or a multiple-choice answer. In one embodiment, an automobile factor that may be a subjective assessment may include interior noise level or appearance. In such an embodiment, the user may enter "opinion" in at least one of first and second data columns 234 and 236 for the interior noise level factor. In another embodiment, a factor that may include a yes/no or true/false answer may be whether the automobile has anti-lock brakes installed. In such an embodiment, in the event the user desires an automobile that includes anti-lock brakes, the user may enter "yes" as the best answer in first data column 234 and "no" as the worst answer in second data column 236. In yet another embodiment, a factor that may include a multiple-choice answer may be the color of the automobile. In such an embodiment, the user may enter "red, green and blue" as the most desired colors in first data column 234 and "white, black and yellow" as the least desired colors in second data column 236. Lastly, once the user has entered the unique factor data for each factor, the user may assign the importance level to each factor using importance indicator 246. After the importance level of each factor have been assigned, the user may view a graphical representation of the importance levels of each factor by navigating to graph factors page 250 by clicking the graph factors radio button 216 on any page shown in FIGS. 3-9.

Once the user has entered the plurality of factors, entered the factor data and assigned the importance level to each factor in factors page 200, engine 118 may determine a plurality of decision options and output those options in decision options page 252, for example as shown in FIG. 5. In one embodiment, information for a plurality of decision options, such as but not limited to products, may be located on the Internet. In one embodiment, engine 118 may search the Internet or any other network or database for decision option information, which has been tagged and therefore searchable using an Internet search engine or any other tool. In the exemplary embodiment, ten decision options 258 may be returned and displayed in decision options page 252. Alternatively, any number of decision options 258 may be returned. In the non-limiting vehicle purchasing decision example, decision options A-J may represent different makes and/or models of vehicles that engine 118 determined were relevant to the decision analysis. In the exemplary embodiment, each determined decision option 258 is displayed on a corresponding data row 256 that includes ON/OFF button 244 associated therewith. The user may include the determined decision option 258 in the decision analysis by switching ON/OFF 244 button to "ON" or exclude the determined decision option 258 by switching ON/OFF 244 button to "OFF". In the exemplary embodiment, all ON/OFF buttons 244 are switched to "ON" which means that all of decision options A-J will be analyzed and compared in the decision analysis. Alternatively, the user may manually provide the plurality of decision options 258 to engine 118.

Once the plurality of decision options 258 have been determined by engine 118, the factor data for each decision option 258 may be displayed in data page 260, as shown in FIG. 6. In the non-limiting vehicle purchasing decision example, the aspects of each automobile are displayed in data page 260. For example, decision option A, or automobile A, gets 42 MPG, costs $24,777, gets 600 miles per tank, received 7 out of 8 stars for interior noise level and has an exterior color of red.

Referring back to FIG. 10, in method step 306, system 100, and more specifically engine 118 may calculate a numeric value, or raw value, that represents the overall desirability of each factor. Specifically, engine 118 may calculate a numeric value of the data entered in first data column 234 that represents a best or most desirable value. Further, engine 118 may calculate a numeric value of the factor data entered in second data column 236 that represents a worst or least desirable value. For example, engine 118 may calculate a numeric value of 10, or any other value that represents the best or most desirable value, for factors that include data that is equal to or greater than the data entered in first data column 234. Similarly, engine 118 may calculate a numeric value of 0, or any other value that represents the worst or least desirable value, for factors that include data that is equal to or less than the data entered in second data column 236. Moreover, engine 118 may calculate a corresponding numeric value for factors that include data that is between the best and worst values entered in first and second data columns 234 and 236 using an algorithm such as linear computation. In the non-limiting vehicle purchasing decision example, for factor 1, or MPG, the user entered a most desirable MPG of 35 and a least desirable MPG of 10. In such an example, engine 118 may calculate a numeric value of 5 for a decision option having an MPG of 22.5, a numeric value of 2.5 for a decision option having an MPG of 16.25, a numeric value of 7.5 for a decision option having an MPG of 28.75 and so forth and so on. Alternatively, factor data that falls between the best and worst desired values entered in first and second data columns 234 and 236 may have numeric values assigned by engine 118 using polynomial computation, logarithmic computation, power computation, exponential computation, moving average computation or any other computation method that enables engine 118 to function as described herein.

In the non-limiting vehicle purchasing decision example, for factor 4, or interior noise level, the user entered "opinion" in at least one of first and second data column 234 and 236, shown in FIG. 3. In the event the decision option 258 includes a subjective assessment or review from a third party that assessment may be used to calculate a numeric value. For example, in one embodiment, the third party automobile review agency may determine that a particular vehicle has a relatively low amount of interior noise and therefore award 7 stars to that vehicle for interior noise. In such an example, engine 118 may calculate the rating percent and convert that percent to the numeric number. For example, 7 out of 10 stars would equal a 70% interior noise rating. Engine 118 may then calculate the interior noise factor as 7. In the event the decision option 258 does not include a subjective assessment for a third party that may be used to calculate a numeric value, engine 118 may inform the user that no numeric value was calculated for that particular factor.

In the non-limiting vehicle purchasing decision example, for factor 9, or ABS, the user entered "yes", or "true", in first data column 234 and "no", or "false", in second data column 236. In such an example, in the event a vehicle includes ABS, the engine 118 may calculate a numeric value of 10 for factor 9. In the event a vehicle does not include ABS, then engine 118 may calculate a numeric value of 0 for factor 9.

In the non-limiting vehicle purchasing decision example, for factor 10, or exterior vehicle color, the user entered "red, green, blue" in first data column 234 and "white, black, yellow" in second data column 236. In such an example, in the event a vehicle includes an exterior color of red, green or blue, engine 118 may calculate a numeric value of 10 for factor 10. In the event the vehicle includes an exterior color of white, black or yellow, engine 118 may calculate a numeric value of 0 for factor 10. Further, in the event that the vehicle color is neither, red, green, blue, white, black nor yellow, engine 118 may alert the user of the vehicle's color.

In the event the user wishes to exclude a factor from the decision analysis, the user may switch ON/OFF button 240 in the factors page 200 to "OFF" for the factor. As a result, engine 118 will not consider that factor in the decision analysis.

In method step 308, once the numeric value of each factor of each decision option 258 is calculated, system 100, and more specifically engine 118 may calculate a weighted score for each factor using the importance assigned to each factor by the user. Scores of each factor may be weighted in any manner, for example by applying a higher weight to scores for factors having a greater importance to the user. Further, the weighted scores can be based on any scaling method and, should not be limited to the numbers or scales shown herein. In the non-limiting vehicle purchasing decision example, the user ranks factor 1 and 2, or MPG and cost, as the most important factors in the decision analysis and therefore assigns an importance ranking of 100 to factors 1 and 2. Further, in the exemplary embodiment, the user assigned an importance value of 50 to factor 3, or miles per tank. Moreover, the user assigned an importance value of 25 to factors 4-10. As a result, in this example, the user desires an affordable automobile that achieves substantially good gas mileage and may be driven a relatively far distance on a single tank of gas. However, other factors, such as interior noise level, acceleration, turning radius and ABS braking are other factors that, while not as important as cost, MPG and miles per tank, they may influence the decision of the user in one way or another.

For example, factor 1, or MPG factor of decision option A, gets 42 MPG. The user indicated that the most desirable MPG for an automobile is 35 MPG. The MPG factor for automobile A is greater than the most desired value and as a result, MPG factor receives a score of 10. Further, the user assigned an importance of 100 for the MPG factor. As a result, the MPG score is multiplied by the importance level. As such, the exemplary weighted score for the MPG factor for automobile A is 10.times.100=1000, as shown in FIG. 7. In the event the MPG was 22.5, as described above, the MPG score would be 5 and the weighted score would be 5.times.100=500. Moreover, the interior noise level factor received 7 out of 10 stars, therefore, receiving a score of 7. The user assigned an importance level of 25 for this factor. As a result, the weighted score of the interior noise level is 7.times.25=175. Further, the exterior color of automobile A is red, resulting in a score of 10. The user assigned an importance level of 25 to this factor. As such, the weighted score of the exterior color factor is 10.times.25=250. Similar calculations are performed for all desired decision options.

Once the weighted score for each factor is calculated by engine 118, the score for each factor and total score for each decision option 258 may be displayed in results page 270, as shown in FIG. 7. In the exemplary embodiment, each automobile, or decision option 258, is displayed with the weighted score of each factor. Moreover, the total score of each automobile is calculated by engine 118 and displayed for each decision option 258. In the non-limiting vehicle purchasing decision example, decision option A, or automobile A, received a total score of 2553, automobile B received a total score of 1960, automobile C received a total score of 2359 and automobile D received a total score of 2118.

In method step 310, as shown in FIG. 10, engine 118 ranks each decision option based on the total score. In method step 312, engine 118 displays a graphical representation of the total scores of each decision option, or automobile, may be displayed in graph results page 280, as shown in FIG. 8. In one embodiment, engine 118 may display the ranks of each decision option based on the total score. Once the total scores of each decision option or automobile are calculated by engine 118, the user may display summary pop-up window 294 on any page by clicking summary button 220, as shown in FIG. 9. Alternatively, summary pop-up window may display any decision analysis information. As such, the user may interpret from FIG. 8 that automobiles options A and J include a majority of the user's desired factors. As a result, system 100 enables the user to choose a decision option based on at least one factor.

Figure 14:
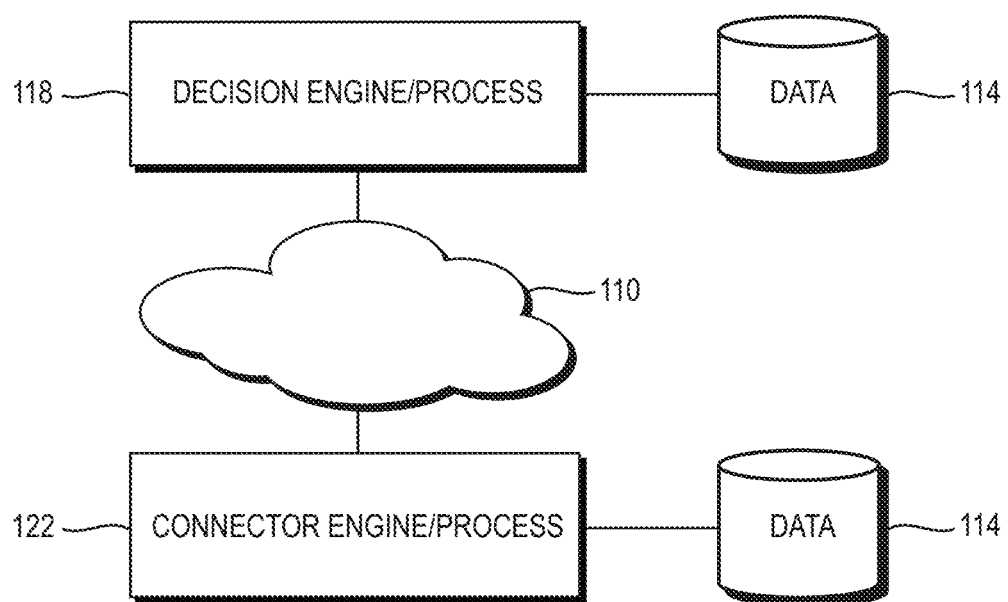
FIG. 14 is a block diagram of decision and response engines that may be provided to the system shown in FIG. 1.

Referring again to FIG. 1 as well as FIG. 14, system 100 may include at least one server 112. Server 112 may include first engine 118, second engine 120 and third engine 122. In at least one embodiment, first engine 118 may be a decision engine, second engine 120 may be a connector engine and third engine 122 may be a response engine.

Connector engine 120 may be an interfacing application for facilitating data sharing between decision engine 118 and response engine 122. Response engine 122 may process the shared data and respond with any type of response. For example, response engine 122 may process the presence or absence of factors, the presence or absence of groups of factors, the presence or absence of decision options, the presence or absence of raw data, the presence or absence of thresholds for factor importance ratings, the presence or absence of thresholds for factor weights, the presence or absence of thresholds for group factor weights, the presence or absence of thresholds for decision option ranks, the presence or absence of thresholds for decision option scores, the bounds of factor definitions, the bounds of normalized factor definitions, the bounds of weighted factor definitions and the like. Response engine 122 may respond with advertisements, alerts, information, grades, URLs, merchants, coupons, opportunities, video, audio, queries, analyses and any other response known to one having ordinary skill in the art. In at least one exemplary embodiment, response engine 122 may be a marketing/advertising engine for responding with types of vendor-related data.

Decision engine 118 may be any embodiment described above or any other decision engine known to one having ordinary skill in the art. Decision engine 118 may be capable of serving a plurality of first users 104 operating client computing devices on a user-accessible portion of network 110, such as the Internet. In web-based embodiments, users 104 may be provided access to decision engine 118 for comparing decision options, for example and referred to hereinafter, but not limited to, products over the Internet through the use of suitable web-browsers operating on the client computing devices. Decision engine 118 may receive a plurality of user inputs and process decision-related data in accordance with the plurality of user inputs. Decision engine 118 may transmit a plurality of product results (e.g., in the form of decision options, relevant products, ranked products, etc.) via network 110 to the client computing devices for consideration by users 104. In at least one embodiment, the one or more product results may be scored, in total and/or by factor, and listed for display. The product results may be listed by rank, for example, with the highest scoring product appearing first in the list. Also, in at least one embodiment, the comparison of products may be based on decision options selected by user 104 from a predetermined set of products made available for user-selection or entry by decision engine 118.

In at least one embodiment, decision engine 118 may provide one or more product modules for comparing types and/or classes of products. As non-limiting examples, products modules may be provided for automobiles, real estate, schools, employment or any other type of product, service or action which may utilize a decision. Moreover, in a non-limiting manner, automobile product modules may be provided for economy vehicles, sport vehicles, sport utility vehicles, luxury vehicles and family vehicles.

Decision engine 118 may provide a plurality of relevant factors for selection by users 104 within each product module. As described above, all or less than all of the plurality of factors may be further definable by at least one of a range of numeric values (broadly read so as to also include a single numeric value), Boolean designations (i.e. yes/no answers and true/false answers), multiple-choice values/answers and any other data for defining factors known to one having ordinary skill in the art. Also, numeric ranges defining factors may include best and worst values with intermediate values defined between the two using any method known to one having ordinary skill in the art. Boolean designations and multiple-choice values may also be used to define best and worst values for the factors. Subjective factors may have pre-supplied definitions, such as those provided by third party entities. For instance, opinion definitions may be rated on a scale of 1 to 10 stars or any other scale known to one having ordinary skill in the art.

As described above, all or less than all of the plurality, of factors may be assigned importance levels/ratings by user 104. The importance ratings may be used by decision engine 118 to weigh the factors. In at least one embodiment and as described above, user 104 may select, define and assign importance ratings to factors through one or more navigation screens/windows presented by decision engine 118 to user 104 via the graphical user interface and display of a client computing device.

In processing the decision-related data, decision engine 118 may define factors in accordance with the user inputs. For instance, a factor may be definable by numeric range. User 104 can input the numeric values (or numeric value) setting the numeric range through data entry provided by decision engine 118. Also, a factor may be definable by one or more Boolean designations/conditions. User 104 may select one of the two answers for each Boolean condition through data entry provided by decision engine 118. Moreover, a factor may be definable by one or more answers out of multiple available values. User 104 may select one or more answers for each set of multiple-choice values through data entry provided by decision engine 118. In at least one embodiment, subjective factors may not be definable by user 104, but may be defined by decision engine 118 (through, for example, third party ratings) and user 104 may select which factors may be considered. All or less than all of the factors selected by user 104 for consideration may be normalized on a standardized numerical scale (e.g., 1 to 10). Factors may then be weighed in accordance with user inputs for weighing such factors, which may be predominantly or wholly based on the importance ratings assigned to the factors by user 104.

As such, the decision-related data may include the factors, importance ratings for the factors and weights for the factors. Factor weights may be expressed as percentages, as one non-limiting example. The decision-related data may also include definitions for factors, whether, for example, by numeric scale, Boolean conditions, multiple-choice answers or subjective assessments. The decision-related data may also include product results (e.g., decision options), ranks for product results and scores (whether weighted or unweighted) for factors and product results. The decision-related data may also include data about user 104 and/or the client computing device of user 104. The decision-related data may additionally include metadata associated with any of the above or any other needed data, as will be readily recognized by one having ordinary skill in the art. All or part of the decision-related data may be stored on at least one database 114.

Still referring to FIGS. 1 and 14, in at least one embodiment, marketing engine 122 may be interfaced with decision engine 118. Marketing engine 122 and decision engine 118 may be interfaced via interfacing application 120. Interfacing application 120 may allow for decision-related data processed by decision engine 118 to be shared with marketing engine 122. Marketing engine 122 may also process the decision-related data and process or provide any desired sales, advertisement, coupon or related data. Decision engine 118 and marketing engine 122 may process the decision-related data in parallel or nearly in parallel. Marketing engine 122 may transmit vendor-related data, or any other desired sales, advertisement, coupon or related data to the client computing devices of users 104 in accordance with the decision-related data.

The vendor-related data may include vendor advertisements, vendor locations, vendor ratings, vendor website hypertext links, vendor coupons, any combination thereof and like data known to one having ordinary skill in the art. The vendor-related data and any decision-related data may be transmitted together so as to be displayed to user 104 on a single web page or single set of web pages (e.g., related navigation screens). For example, a web page displayed to user 104 may show scored product results and may show vendor advertisements therewith. All or part of the vendor-related data can be stored on at least one database 114.

Vendor-related data may also include vendor marketing profiles that marketing engine 122 may process and match to the decision-related data that is also processed by marketing engine 122. The vendor marketing profiles may establish criteria for transmitting the other vendor-related data, such as vendor advertisements. The vendor marketing profiles may establish criteria for sending other vendor-related data (e.g., vendor advertisements) based on decision factors, importance ratings for the decision factors, importance ratings for the factors (or for groups of the factors), weights for factors (or for groups of the factors), ranks for the factors, definitions for the factors (and the underlying data defining the factors), product results (e.g., decision options), ranks for the products results, scores for the factor or product results, any combination thereof and the like.

Interfacing application 120 may tie marketing engine 122 to decision engine 118. Interfacing application 120 may be on at least one server 112. A primary purpose of interfacing application 120 may be to facilitate data between decision-engine 118 and marketing engine 122. In particular, interfacing application 120 may facilitate sharing of all or part of the decision-related data with marketing engine 122. As such, interfacing application 120 may provide the needed decision-related data to marketing engine 122.

Accordingly, an interfacing computer program product stored on a computer storage medium may include a computer program mechanism embedded in the computer storage medium for causing a computer to interface decision engine 118 and marketing engine 122. The computer code mechanism may include a computer code device configured to interface with decision engine 118. The computer code mechanism may also include another computer code device configured to interface with marketing engine 122. The computer code mechanism may further include yet another computer code device configured to facilitate data sharing between decision engine 118 and marketing engine 122.

Figure 11:
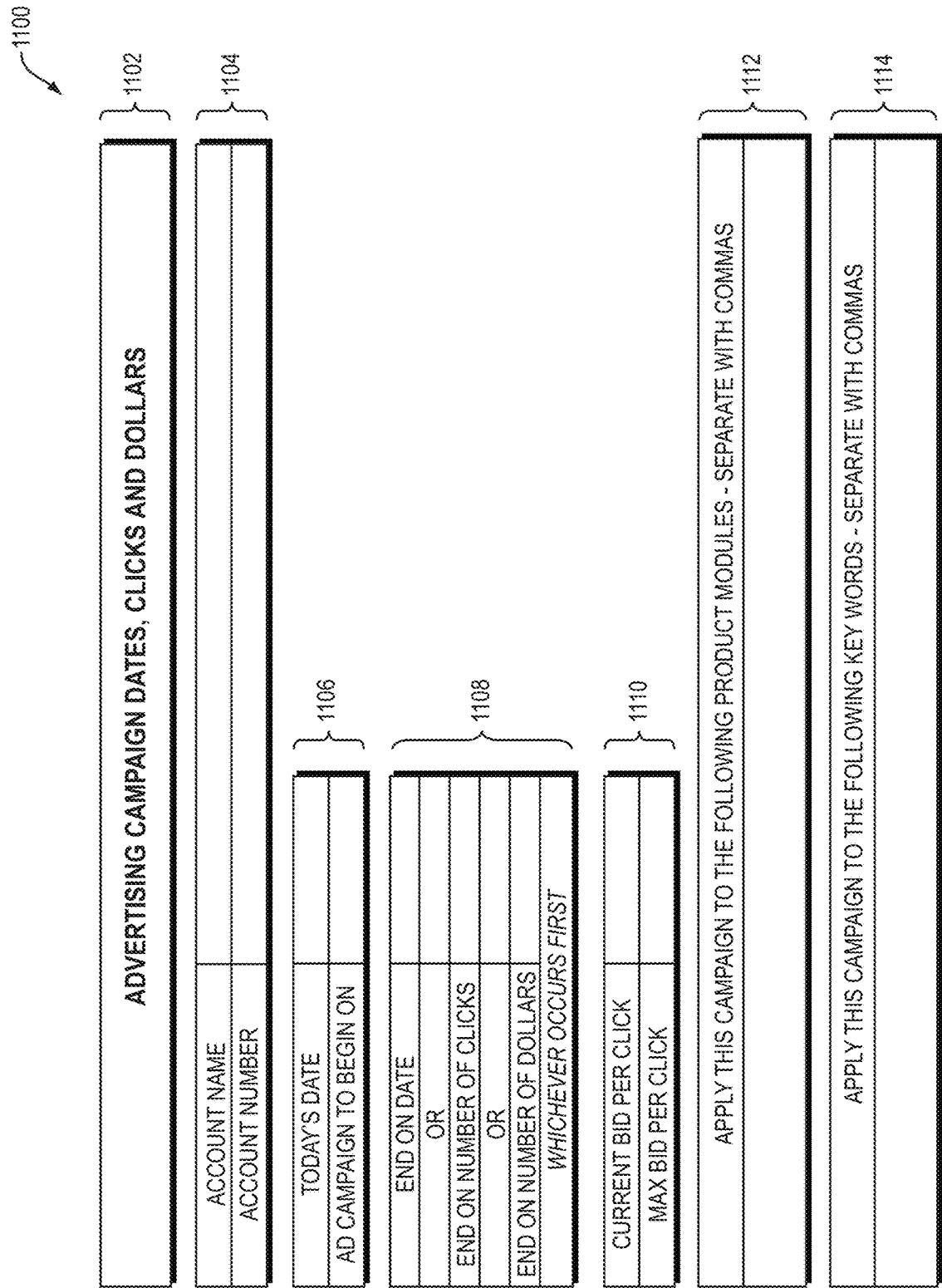
FIG. 11 is an illustration of a marketing profile data entry page that may be used with the system shown in FIG. 1.
Figure 12:
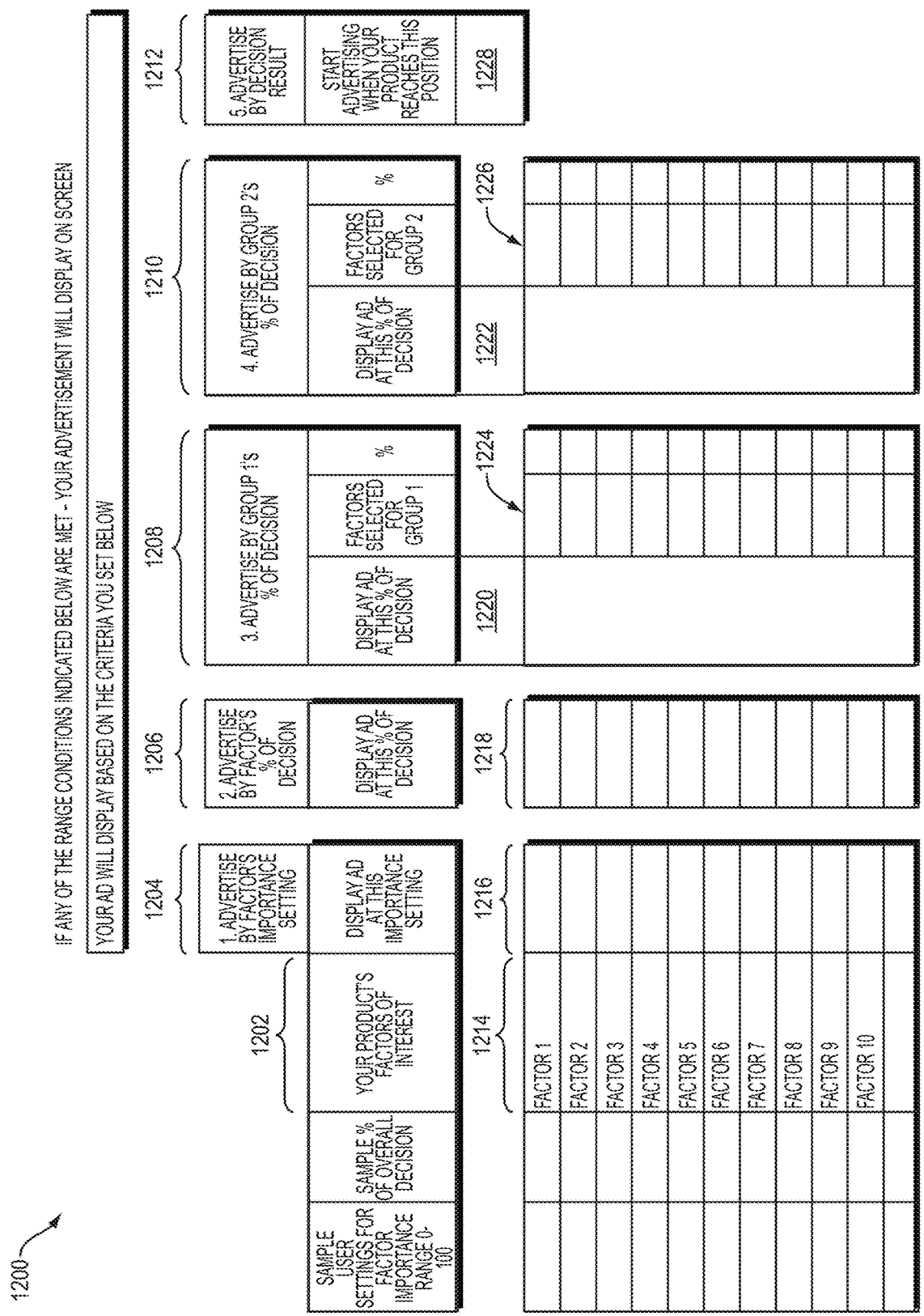
FIG. 12 is an illustration of another marketing profile data entry page that may be used with the system shown in FIG. 1.

FIGS. 11 and 12 illustrate marketing profile data entry page 1100 and marketing profile data entry page 1200, respectively, that may be used with system 100, particularly, with marketing engine 122. In web-based embodiments, data entry pages 1100, 1200 may be web page forms provided by marketing engine 122 to the client computing devices of second users 106 via network 110. Second users 106 may be any entity or party involved in marketing or advertising, such as, but not limited to, advertising agencies, advertisers and specific product entities.

Marketing engine 122 may effectuate electronic advertising by providing users 106 with marketing profiles to establish criteria for conducting electronic advertising campaigns. Accordingly, marketing engine 122 may present one or more user-fillable marketing profile forms to users 106 for data entry of inputs defining criteria for an electronic advertising campaign. The marketing profiles and associated forms may be provided in numerous configurations and designs, as will be readily recognized by one having ordinary skill in the art. As such, marketing profiles may make use of numerous data entry fields and GUI widgets in providing tillable forms to users 106.

Referring particularly to FIG. 11, web page form 1100 for establishing criteria for conducting an electronic advertising campaign is illustrated in accordance with at least one exemplary embodiment. Marketing profile form 1100 may include a plurality of data entry fields for accepting user inputs corresponding to required or optional campaign information and criteria. Form 1100 may also provide directions that guide users 106 to fill out form 1100 by the way of data inputs for establishing or modifying an electronic advertising campaign.

Form 1100 may be directed to a running auction-style of electronic advertising campaigns, which may operate, at least in part, based on a bid-per-click system. Accordingly, the electronic advertising campaign may be priced based on a pay-per-click system or may be based and priced on any other system known to one having ordinary skill in the art. The running auction-style of electronic advertising campaigns and the pay-per-click pricing systems are well-known to one having ordinary skill in the art and further discussion directed thereto will be limited or omitted herein.

Form 1100 may include numerous sections of which the following are exemplary of. Form 1100 may include a title/heading section 1102. As shown in an illustrative and non-limiting manner, form 1100 may be entitled "Advertising Campaign Dates, Clicks and Dollars." Section 1104 of form 1100 may provide for data entry regarding account identifiers, such as, but not limited to, account name and account number. In at least one embodiment, account identifiers may be automatically provided by marketing engine 122 to user 106 who may be logged into their user account. Alternatively, user 106 may input data for identifying an account.

Form 1100 may include present date and campaign start date section 1106. The present date may be automatically provided to user 106 by marketing engine 122 and the campaign start date may be selected by user 106, as one non-limiting example. Form 1100 may also include section 1108 establishing campaign termination criteria. User 106 may input data establishing such termination criteria. As shown in an illustrative and non-limiting manner, termination criteria may be conditioned in the alternative with the first occurrence of any of the termination criteria resulting in the termination of the electronic advertising campaign. For instance, the alternative termination criteria may be a termination date, an amount of click-through or a campaign budget ceiling.

Form 1100 may further include bid-per-click section 1110. As shown in an illustrative and non-limiting manner, bid-per-click section 1110 may be used to establish a present bid-per-click and a maximum bid-per-click. User 106 may input such data and later be subjected to a running auction conducted by marketing engine 122 based on bid-per-click data.

Moreover, form 1100 may include product module section 1112. In at least one embodiment, decision engine 118 may provide and be applied to different products separately through a plurality of product modules focused on comparing certain types and/or classes of products. User 106 may only advertise in a product module(s) that user 106 deems most relevant to the goods and/or services user 106 is marketing. Accordingly, user 106 may select which product module(s) to apply the electronic advertising campaign to by inputting such into product module section 1112. In at least one embodiment, user 106 may select more than one product module to effectuate the electronic advertising campaign within.

Furthermore, form 1100 may include keyword section 1114. In at least one embodiment, decision engine 118 may provide for keyword-based searching and comparisons alone or in combination with factor-based comparisons. For example, keyword-based searching may be provided by decision-engine 118 in order to allow first user 104 to identify one or more relevant product modules in which to perform a factor-based comparison. Second user 106 may select one or more keywords to apply an electronic advertising campaign to.

Referring particularly to FIG. 12, web page form 1200 for establishing criteria for conducting an electronic advertising campaign is illustrated in accordance with at least one exemplary embodiment. Form 1200 may function as a continuation or counterpart of form 1200 in establishing campaign criteria. In particular, form 1200 may be directed to establishing factor-based and results-based criteria for the electronic advertising campaign. Form 1200 may include a plurality of data entry fields for accepting user inputs corresponding to required or optional campaign information and criteria. Form 1200 may also provide directions that guide users 106 to fill out form 1200 by the way of data inputs for establishing or modifying an electronic advertising campaign.

Factor-based and result-based form 1200 may include numerous sections of which the following are exemplary of. For example, form 1200 may include sections 1202, 1204, 1206, 1208, 1210, 1212 directed to establishing criteria based on factors of interest, importance ratings for the factors, weights (e.g., by percentage) for the factors, weights for a first group of factors, weights for a second group of factors, rank of vendor's product in results list, respectively, and any other suitable sections for establishing criteria, as will be readily recognized to one having ordinary skill in the art.

Factors of interest section 1202 may include one or more factors of interest 1214 subject to criteria being established in relation thereto. In at least one embodiment, factors of interest 1214 may be provided in section 1202 by marketing engine 122. Users 106 may establish criteria in relation to factors of interest 1214 automatically provided by marketing engine 122.

Importance rating section 1204 may be provided to user 106 by marketing engine 122 for inputting a minimum level of importance for any factor that would trigger the electronic advertising campaign. For example, by placing an importance rating value in an appropriate data entry field 1216 for a factor, user 106 may set the importance rating floor for that factor.

Individual factor weight section 1206 may be provided to user 106 by marketing engine 122 for inputting a percentage of the overall decision for any factor that would trigger the electronic advertising campaign. For example, by placing a weight value in an appropriate data entry field 1218 for a factor, user 106 may set a percentage floor for that factor.

Either or both of first group weight section 1208 and second group weight section 1210 may be provided to user 106 by marketing engine 122 for inputting a percentage of the overall decision for any group of factors that would trigger the electronic advertising campaign. For example, by selecting more than one factor by placing indicia in the appropriate data entry fields 1224, 1226 and setting a percentage floor by placing a weight value in the appropriate date entry field 1220, 1222, user 106 may set a cumulative percentage floor for the group of selected factors.

Product rank section 1212 may be provided to user 106 by marketing engine 122 for inputting a position for their product within a results list that would trigger the electronic advertising campaign. For example, by placing a rank value in data entry field 1228, user 106 may set a rank floor for triggering the electronic advertising campaign.

Figure 13:
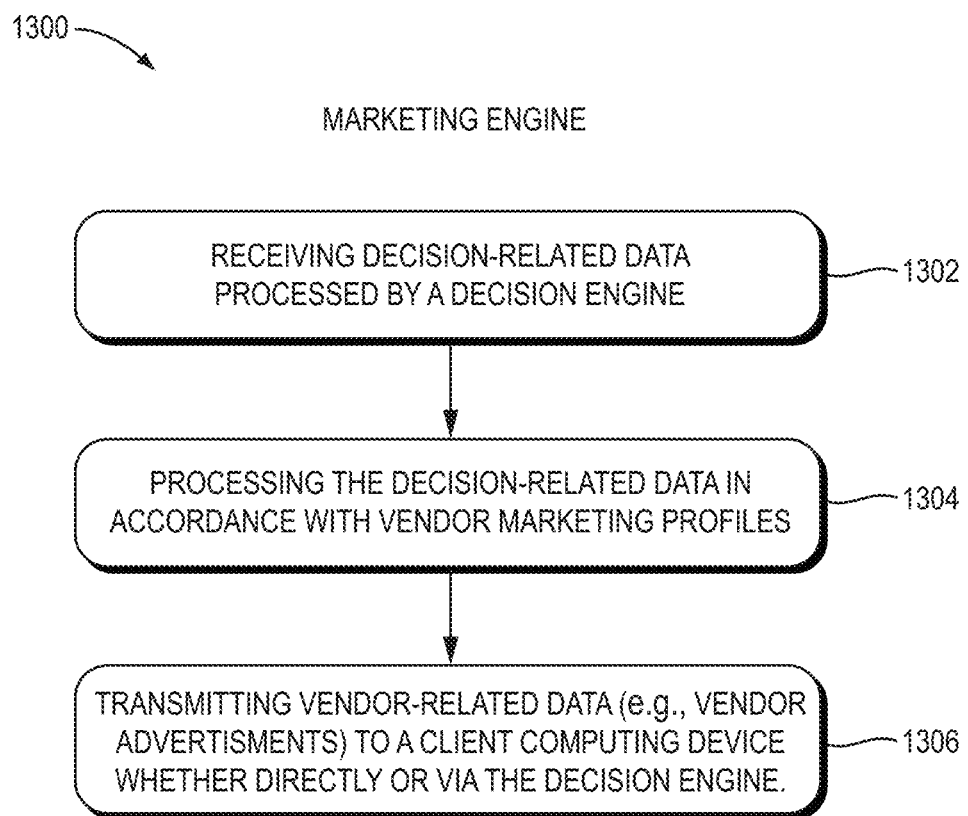
FIG. 13 is a flowchart of a method of providing vendor-related data in response to decision-related data using the system shown in FIG. 1.

FIG. 13 is a flow chart of exemplary method 1300 of providing vendor-related data to a client computing device in response to decision-related. Method 1300 may be performed by marketing engine 122 in accordance with the vendor marketing profiles. In method step 1302, marketing engine 122 may receive decision-related data processed by decision engine 118. The decision-related data available from decision engine 118 may include, but is not limited to, factors (including required and optional factors), factor importance ratings, factor weights, raw data (e.g., numerical, descriptive, perspective, subjective and objective), factor definitions, normalized factor definitions, weighted factor definitions, factor scores, product results, product ranks, product scores and the like.

In method step 1304, marketing engine 122 may process the decision-related data in accordance with the vendor marketing profiles. For example, marketing engine 122 may match decision-related data to the vendor marketing profiles in determining what, if any, vendor-related data should be sent to a client computing device of user 104.

In accordance with the vendor marketing profiles for each product module, marketing engine 122 may process (and match) the presence or absence of factors, the presence or absence of groups of factors, the presence or absence of product results, the presence or absence of raw data, the presence or absence of thresholds for factor importance ratings, the presence or absence of thresholds for factor weights, the presence or absence of thresholds for group factor weights, the presence or absence of thresholds for product ranks, the presence or absence of thresholds for product scores, the bounds of factor definitions, the bounds of normalized factor definitions, the bounds of weighted factor definitions and the like.

Marketing engine 122 may also process the vendor marketing profile data to determine the status (e.g., active or inactive) of electronic advertising campaigns, bid-per-click data (e.g., present or maximum) and the like. Similarly, marketing engine 122 can process or provide sales-related data, facilitate sales and provide any other data relevant to sales or which may be desired to facilitate sales, such as advertisements or coupons. Marketing engine 122 may also apply rules governing the running auction in determining which vendor-related data is to be transmitted and in what order of priority it will be displayed on a client computing device of user 104.

In method step 1306, marketing engine 122 may transmit the vendor-related data, as determined, to a client computing device of user 104 via network 110. The vendor-related data may include any of vendor advertisements, vendor locations, vendor ratings, vendor websites links, vendor coupons, text, audio, video, images, database query answers, any combination thereof and like data known to one having ordinary skill in the art. In some embodiments, the vendor-related data may be primarily in the form of electronic advertisements providing hypertext links to the websites of users 106 or any other supply or information source, but is not so limited. Moreover, electronic advertisements and any other suitable vendor-related data may appear on any GUI screen (e.g., results pages, navigation windows, etc.). Furthermore, the electronic advertisements may be provided anywhere (above, below, to the side of, etc.) in relation to a list of product results or any other decision-related data on a web page displayed on a client computing device of user 104.

Figure 15:
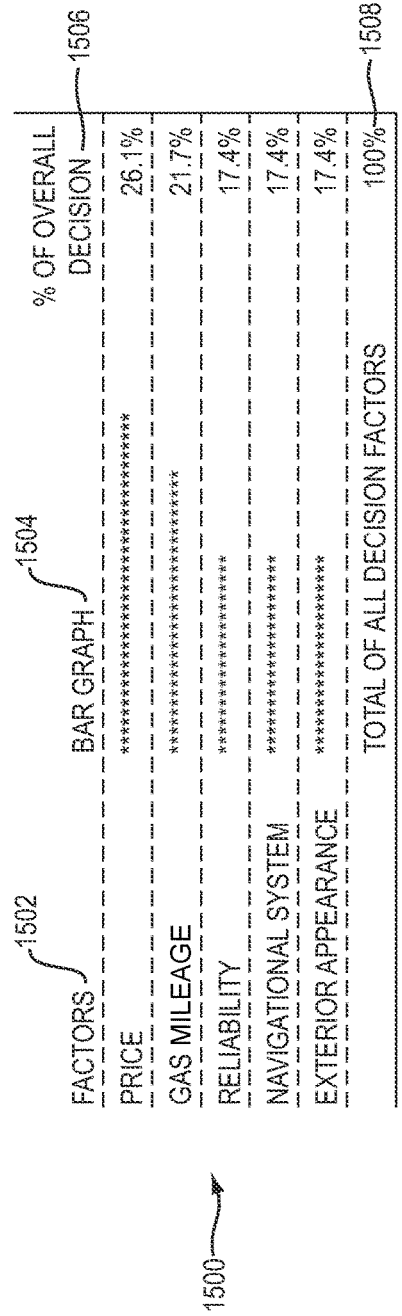
FIG. 15 is an exemplary diagram of a unique set of factors associated with a user.

In still another exemplary embodiment, and referring to FIG. 15, examples of decision factors and scoring may be shown. In this example, a number of factors may be used in a decision making process. Here, through interface 1500, a number of exemplary factors 1502 may be shown. Additionally, a bar graph 1504 that may correlate to a percentage of overall decision, or weight, 1506 may be displayed. Finally, a total value 1508 may be represented at a bottom portion of the interface 1500. The factors 1502 and their manner of being displayed in interface 1500 may act as both numerical and graphical representations of a user's importance settings when he or she is engaged in a decision making process.

In the example shown with FIG. 15, a fingerprint, or set of factors, such as decision-related factors, that pertain to a desired user, may be determined, realized or utilized. The fingerprint may be used to compare options from within a predetermined or specific set of decision possibilities or outcomes. For example, because each user of a decision making engine, such as those described in previous examples, may be unique insofar as they may each generate a different mix of factor weights, these uniqueness of each user may result in different rankings of the available options. Thus, through a comparison of the different factors 1502 and weights 1506 of each user's decision making, various dynamics of the decision may be further understood and explored. Thus, any factors and weighting chosen by a user may be stored and compared in any desired manner. For example, the factors and weighting of any number of different users may be compared. Similarly, the factors and weighting of any number of users may be compared with the factors and weighting of one or more experts in a desired field. Additionally, a fingerprint of any user may be saved automatically or may be saved as desired at any time. Any fingerprint data may then be stored in a database or multiple databases for any desired form of comparison.

As shown in the example with respect to FIG. 15, a user may base a purchasing decision on five factors 1502, for example price, gas mileage, reliability, navigational system and exterior appearance. The user may then apply a weight 1506 to each factor and the weight may be shown both in numerical form 1506 as well as graphical form 1504. Additionally, although a bar graph is shown in exemplary FIG. 15, any form of graph or any other representation of weight 1506 may be utilized. In the present example, a user has given a weight of 26.1% to the factor of price, 21.7% to the factor of gas mileage and equal weights of 17.4% to the factors of reliability, navigational system and exterior appearance. The total 1508 is thus shown as 100%. This information, when viewed together, may be saved or presented as a fingerprint of that particular user for the exemplary purchasing decision shown in FIG. 15.

Fingerprint data, or saved user data regarding a purchasing decision, may then be used in any of a variety of manners. For example, different users may view fingerprint data, perhaps anonymously, of other users who may have engaged in a similar purchasing decision. Also, different exemplary fingerprints may be shown to provide a user with the various options and alternatives that may be displayed as the weighted factors are varied. Further, a database of fingerprint data from any number of users of a decision making engine may be collected and used in any further manner desired. In one exemplary, various demographics may be viewed and polled for their desired weighted factors in a purchasing decision.

Figure 16:
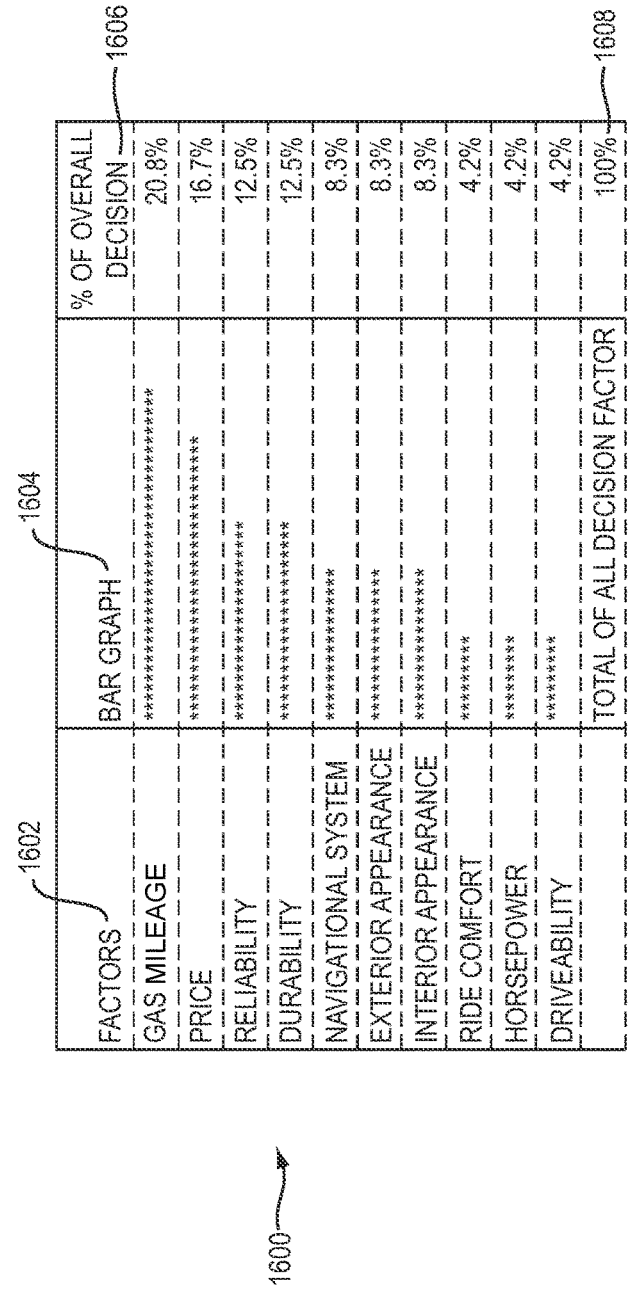
FIG. 16 is another exemplary diagram of a unique set of factors associated with a user.

One exemplary manner of viewing demographic data, as shown in exemplary FIG. 16, could be querying a database to determine a list of average weighted factors for purchasing an automobile for any desired characteristics, such as asking what predetermined sex of users of the decision making engine, who live in a predetermined geographical area, have a predetermined income and have any other predetermined characteristics. As shown on interface 1600, the factors 1602 of such users may be shown to apply weights 1606 (and as shown in graphs 1604) may represent the combined or averaged fingerprint data for any number of users fulfilling any desired criteria.

Figure 17:
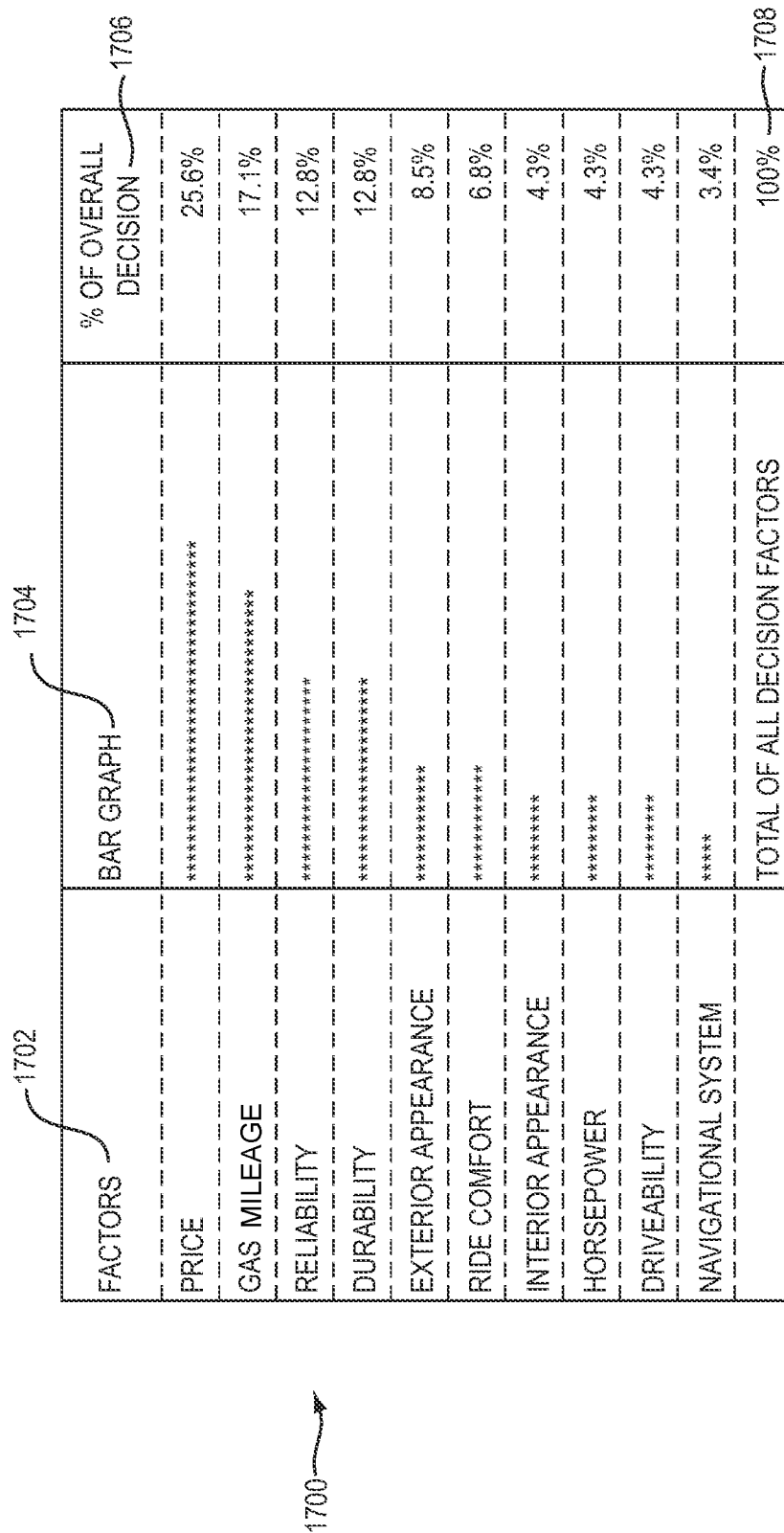
FIG. 17 is an exemplary diagram of a base set of factors of a user.

In another exemplary embodiment, and as shown in exemplary FIG. 1700, a user may be presented with or a decision making engine may otherwise employ a default set of fingerprint data or default set of weighted characteristics. In these exemplary embodiments, any default data may be based on a predetermined or historical interpretation of data. Additionally, any number of factors may be utilized in the default data, for example the use of ten factors and their respective default weights. Further, the amount of default fingerprint data may be changed or varied in any desired manner. For example, if a user is presented with a list of default data, which could correspond to the data shown in interface 1700, the user may be able, to add or remove any number of factors so as to refine the list of default fingerprint data to a greater or smaller number of factors. This can assist a user who may or may not know a predetermined amount to weight a factor in a decision or purchase they may be planning to make. In the example shown in FIG. 17, the user may decide that a factor such as exterior appearance in the list of default factors 1702 is not important to that user. This factor may then be removed, along with its corresponding weight 1706. Thus, a user may be presented with a new or varied list of choices as based on the altered factors. Similarly, any new factor not shown on the list of factors 1702 may be added as desired.

In another exemplary embodiment, and as shown with respect to FIGS. 18 and 19, after fingerprint or any other data is saved for a user, the user may input any desired product data or datasets into a decision engine. The decision engine may then provide the user with a score based upon the user's desired factors 1802 and weights 1806 (or importance settings). In the examples of FIGS. 18 and 19, an automobile purchase decision may be contemplated by the user. The factors 1802 and weights 1806 may then be inputted per the user's fingerprint data and corresponding graphs 1804 may be shown. A decision engine may then process this data and, based upon any available automobile, provide the user with scores and a best option.

As shown in exemplary interface 1900 of FIG. 19, a series of scores and a best choice may be shown. Based upon the information shown amongst the fingerprint data of exemplary FIG. 18, two or more choices, in this case automobiles, may be returned to the user with their respective scores. Similar to the comparison methodology discussed previously, a first automobile may show scores 1902 based upon an equal weighting of all available factors. The first automobile may then show scores 1904 based upon the weighted factors from the user's fingerprint. Similarly, weighted and unweighted scores 1906 and 1908, respectively, may be shown for a second automobile choice. These scores may then be totaled in a bottom portion 1910 of interface 1900. At a top portion of interface 1900, the two weighted scores using the user's fingerprint of data may then be shown 1912. The automobile, or any other product or decision choice otherwise, with the highest score with respect to the fingerprint data weighted values of the user may then be highlighted in any desired manner, for example by displaying the word "WINNER" proximate to the highest score.

Figures 20, 21:
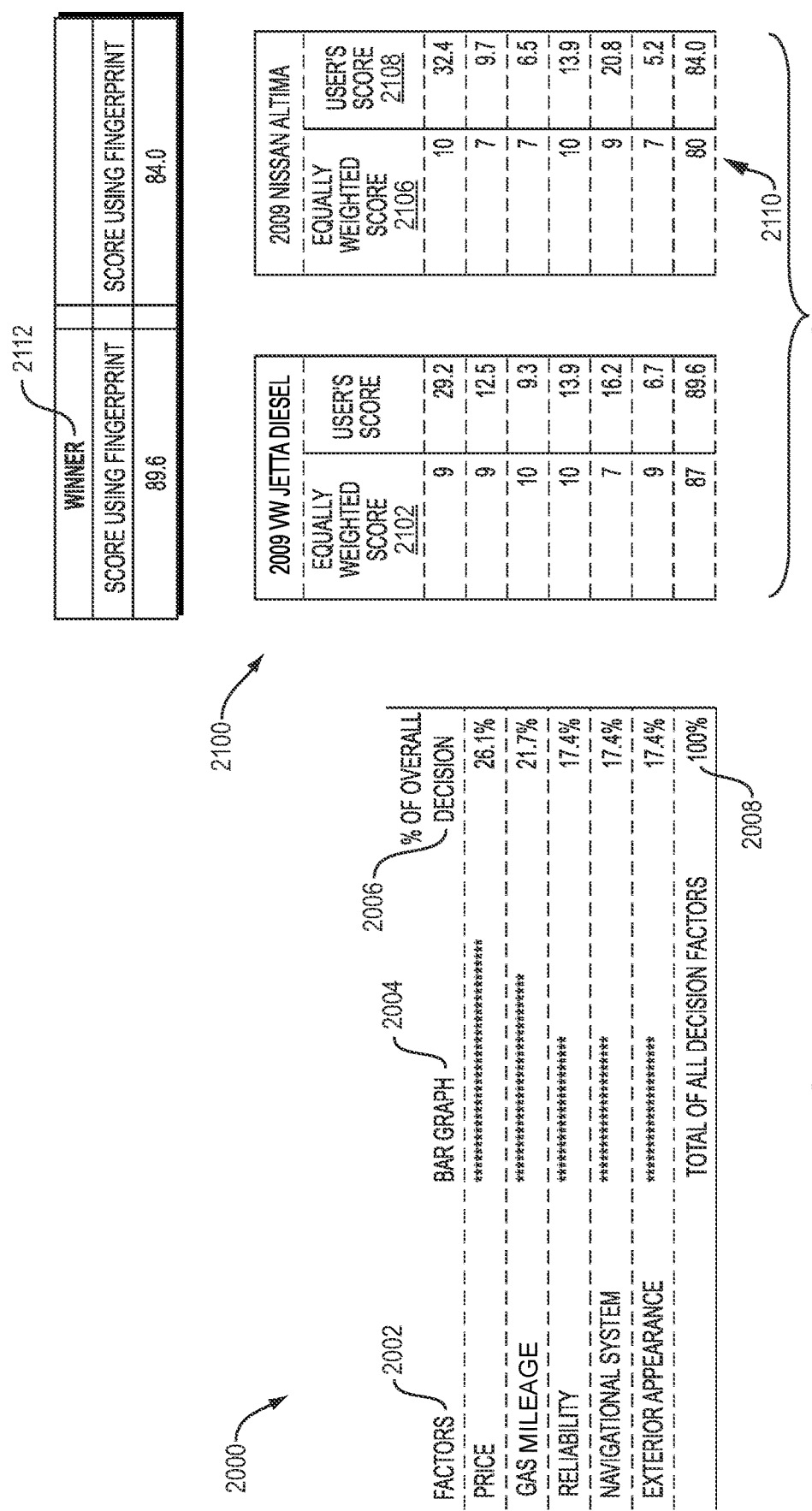
FIG. 20 is another exemplary diagram of a score based upon factors of a user.
FIG. 21 is another exemplary diagram of a score based upon factors of a user.

In a further example of the use of fingerprint data, as shown in exemplary FIGS. 20 and 21, different factors 2002 and weights 2006 (as further shown with graph 2004) may be saved or otherwise known as the fingerprint data of a user. The decision making engine may then process the data and provide the user with the output scores 2102 through 2108, the totals 2110 and the display scores 2112 at a top portion of interface 2100 so as to clearly show the product choice with the highest score.

In still another exemplary embodiment, any of the fingerprint data that may be stored for a user in the examples related to FIGS. 16-21 may be utilized on a mobile device, such as a mobile computing device. In this example, a user may be at a location, such as a store, that sells products that a user may be interested in purchasing. There may, however, be a variety of products from which the user may desire to choose. Thus, a user may input data regarding the physical product in any desired manner into their mobile device. Exemplary manners of inputting data may include typing a name, typing a serial number, photographing a product, photographing a serial number, scanning a barcode, photographing a barcode or any other manner of inputting data desired. The user's mobile device may then be connected with a decision making engine similar to any of the exemplary embodiments described herein. Additionally, the mobile device may be connected to the decision making engine in any desired fashion. Using fingerprint or any other user-related input data, the decision making engine may process the data inputted by the user into the mobile device. The processing of the data may allow for the user to receive a number of scores, for example weighted scores as described herein, on their mobile device. The user may then be able to purchase an item based upon the scores provided to them.

Figure 22:
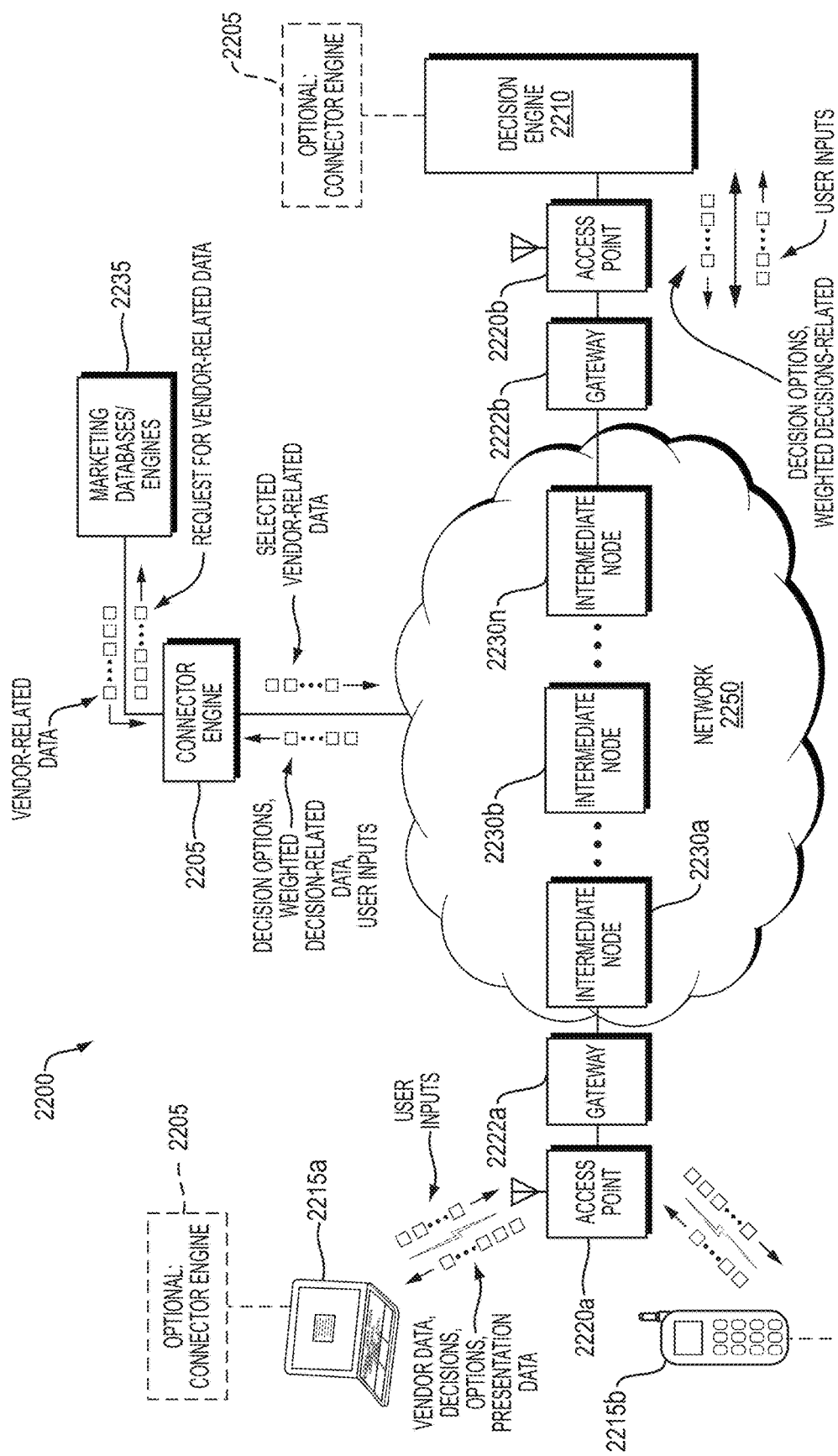
FIG. 22 is network diagram illustrating a connector engine used to connect a decision engine to a marketing engine in accordance with an example embodiment of the present disclosure.

FIG. 22 is a block diagram of a communications network 2200 for implementing an embodiment of the present disclosure. The communications network 2200 includes a collection of communication links interconnecting a plurality of nodes, such as communication units 2215a-b, access points 2220a-b, intermediate nodes 2230a-n, connector engine 2205, marketing database/engine 2235, and decision engine 2210. These interconnected nodes communicate with each other by exchanging data packets according to a pre-defined set of network protocols, such as the Transmission Control Protocol/Internet Protocol (TCP/IP) and the Session Initiation Protocol (SIP). A network protocol as used herein is a formal set of rules that define how data is exchanged between nodes in a communications network.

As described in more detail herein, the connector engine 2205 may be employed to improve, customize, or otherwise modify a marketing campaign by connecting the decision engine 2210 to the marketing database/engine 2235 to provide a user of communication devices 2215a-b with data associated with a marketing campaign (e.g., vendor-related data). Before describing the connector engine 2205 in more detail, a description of the communications network 2200 is provided. It should be understood that the connector engine 2205 may be employed in other network topologies or applications, such as single processor machines.

Communication units 2215a-b may be conventional communication units, such as laptop computers, desktop computers, wireless transmit/receive units (WTRUs) (e.g., wireless telephones, personal digital assistants (PDAs), and smart phones), IP telephones, and the like, that convert information (e.g., data) into signals that are transmitted to the access points 2220a-b via wireless links.

The access point 2220a contains logic that enable the communication units 2215a-b to transmit the information (e.g., data) to the decision engine 2210 via the network 2250. For example, the access point 2220a may include circuitry configured to receive signals (e.g., radio frequency (RF) signals), from the communication units 2215a-b, that carry the information via wireless links. Once the signals are received, the access point 2220a converts the signals into data packets according to the pre-defined set of network protocols. The access point 2220a then transmits the data packets to the network 2250 via gateway 2222a. The access point 2220b transmit data/information is a similar manner as the access point 2220b. In addition, the access points 2220a-b convert data packets received from the network 2250 into signals and transmit the signals to the communication units 2215a-b and the decision engine 2210 via wireless links.

Examples of access points 2220a-b that may be used with the present invention include certain Institute of Electrical and Electronic Engineers (IEEE) 802.11 compliant access points as well as certain cellular telephone wireless systems that support the transmission of traffic (e.g., data traffic). Other forms of access points now known or hereafter developed are contemplated to be operable with embodiments of the present disclosure.

The network 2250 receives the data packets from the gateways 2222a-b and transmits the data packets to a destination via the intermediate nodes 2230a-n. The destination can be defined by a destination address. In an example, the destination address is located in a header of the data packets. The intermediate nodes 2230a-n are typically conventional intermediate nodes, such as routers, that are configured to implement a communications protocol such as an Internet Protocol (IP) or Voice Over Internet Protocol (VoIP) network 2250.

It should be noted that embodiments of the present disclosure may be adopted to work with fixed as well as mobile devices that are able to communicate with a communication network. Examples of fixed devices include telephone units, personal computers, and the like that are wired to a network.

As illustrated, the connector engine 2205 may be located at an intermediate point of the network 2250 between the communication units 2215a-b and decision engine 2210. Optionally, the connector engine 2205 may be logically or physically coupled directly to the communication units 2215a-b and/or decision engine 2210.

Figure 23:
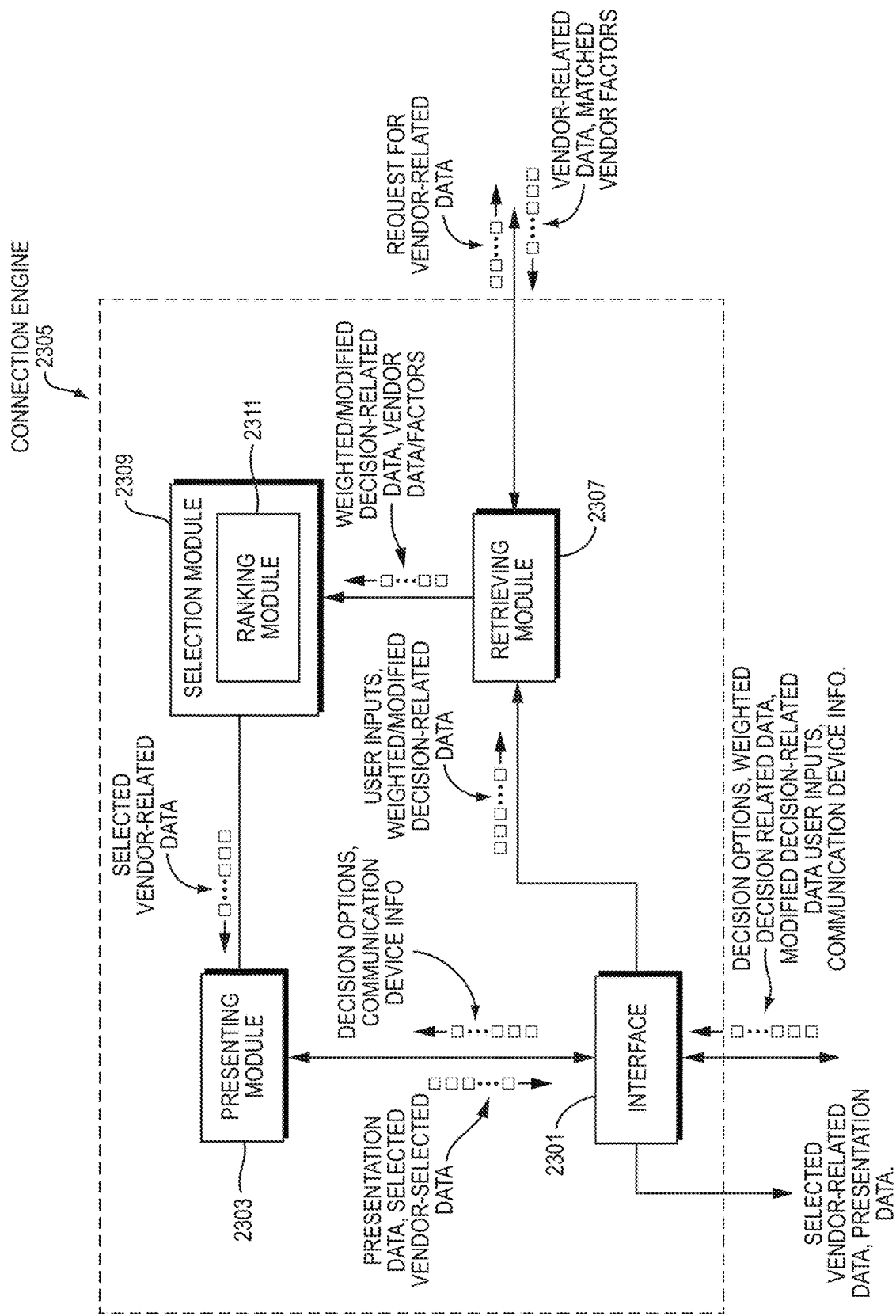
FIG. 23 is a block diagram of a connector engine in accordance with an example embodiment of the present disclosure.

The connector engine 2205 employs an interface (as illustrated in FIG. 23) which enables vendors (associated with marketing engines 2235) to provide marketing data (e.g., vendor-related data such as advertisements, coupons, and discounts) to users of the communication units 2215a-b in communication with the decision engine 2210. In some examples and as described above in reference to FIGS. 6-10, the users of the communication units 2215a-b access the decision engine 2210 in order to compare decision options, for example, products/services over the Internet. For instance, the user may wish to purchase a camera (i.e., a product) and may utilize the decision engine 2210 to assist with identifying cameras and ultimately deciding which specific type of camera to purchase, such as a Canon® camera or a Nikon® camera (i.e., decision options). In such a scenario, vendors, whose products are not associated with the decision engine 2210, may wish to provide marketing data to the users in response to at least one of the following: the user interaction with the decision engine 2210 or results of the decision engine 2210.

For instance, the user may utilize the decision engine 2210 to make a decision to purchase a camera by utilizing data entry interface page 200 (as illustrated in FIG. 3). In this example, the decision engine provides the user with factors on the page 200 that users generally consider when purchasing a camera (e.g., price, lens type, and zoom capabilities). Based on a user's input with respect to each of the factors 232 (see FIG. 3) (e.g., input to the data fields 234, 236 (see FIG. 3) and application of importance values 245 (see FIG. 3) to each factor), the decision engine 2210 provides a selection of cameras (e.g., decision options) to the user to consider in, making a decision to purchase a camera (see FIG. 8-9).

In some scenarios, the decision engine 2210 may not present a camera associated with a vendor as a decision option (i.e., a result of the decision engine). In this case, the vendor may wish to provide the user with marketing data associated with a camera sold by the vendor. In addition, the vendor may wish provide the user with marketing data associated with a camera that best fits the user's input with respect to the factors 232 (see FIG. 3) (i.e., the user interaction with the decision engine 2210).

In an embodiment of the present disclosure, the connector engine 2205 monitors the network 2250 for communications between a user of one of the communication devices 2215a-b and decision engine 2210 over network 2250. The connector engine 2205 may monitor SIP messages (or other type of messages) that indicate whether the user is attempting initiate a communications session with a server known to employ a decision engine 2210. For instance, the connector engine 2205 may compare destination addresses associated with the messages to a lookup table that includes servers known to be hosting decision engines. If the destination address matches an address associated with such a server, the connector engine 2205 determines that the user is initiating a communication session between the user and a decision engine.

Once the connector engine 2205 determines that a communication session is occurring between a user and a decision engine, the connector engine monitors and retrieves communication data between the user's communication device 2215*a-b* and the decision engine 2210. As stated above, a user may be utilizing the decision engine 2210 because the user wants the decision engine to provide decision options associated with the user's desire to purchase a good/service (e.g., a camera). The decision engine 2210, as stated above, may provide a user interface (as illustrated in FIGS. 3-9) for the user by which the user may interact with in order to facilitate the decision engine 2210 to provide decision options to the user (e.g., a set of specific cameras for which the user to consider to purchase). In an example and as stated herein, the decision engine 2210 may provide a user with a plurality of relevant factors associated with a product/service of interest. In this example, the user may be interested in cameras. Thus, the decision engine may provide a list of factors 232 (see FIG. 3) (e.g., lens, price, weight, digital information, and zoom) to the user as described above in reference to FIGS. 3-4. At the end of the user's interaction with the decision engine 2210, the decision engine 2210 outputs at least one decision option (e.g., a suggested camera to purchase) to the user.

The connector engine 2205 receives data associated with the user's interaction with the decision engine 2210. For example, the connector engine 2210 receives the user inputs with respect to each of the factors 232 (see FIG. 3) In addition, the connector engine 2210 receives the importance values provided by the user with respect to each factor 232 (see FIG. 3) and the results output by the decision engine 2210 (e.g., decision options (see FIGS. 6-9).

In response to receiving the data associated with the user's interaction with the decision engine 2210, the connector engine 2210 retrieves marketing data (e.g., vendor-related data) from the marketing database/engine 2235. In an example, the connector engine 2210 may retrieve the marketing data by submitting a request to the marketing database/engine 2235 for marketing data that corresponds to the user's interaction with the decision engine 2210. In response to the request, the marketing database/engine 2235 returns relevant marketing data to the connector engine 2210. The marketing database/engine 2235 may be a central server including a plurality of marketing databases/engines corresponding to a plurality of vendors. Alternatively, the connector engine 2210 may be coupled to a plurality of marketing database/engines, each database/engine corresponding to a single vendor. In this example, the vendors may be a manufacturer of cameras such as Nikon, Canon, and Kodak®. The vendors may also be retailers that sell said cameras such as Best Buy, Wal-Mart, and Sears. Alternatively, the vendors may be any entity that would like to provide marketing data in response to the user's desire to purchase a camera (e.g., airlines and travel booking entities).

In order to determine which vendors offer products or services that are responsive to a user's desires, and, thus, the marketing databases/engines from which to retrieve marketing data (e.g., vendor-related data), the connector engine 2205 matches at least one factor of the decision-related data with vendor factors associated with the marketing data. The connector engine 2205 then obtains the marketing data associated with at least a subset of the matched vendor factors. In response to selecting the marketing data, the connector 2205 processes the received data associated with the user's interaction with the decision engine 2210 (e.g., modified decision-related data (factors)) and modifies the vendor factors associated with the selected marketing data.

The connector engine 2205 then selects a subset of the marketing data (e.g., vendor-related data) based on the modified vendor factors.

FIG. 23 is a block diagram of an example embodiment of a connector engine 2305 that includes an interface 2301, presenting module 2303, selection module 2305, ranking module 2311, and retrieving module 2307.

The interface 2301, which is provided on one or more processors, is configured to receive data associated with a user's interaction via communication devices 2215*a-b* with the decision engine 2210. The interface 2301 is also configured to pass the data to one of the aforementioned modules based on the type of data received. For example, the data received may be user inputs to the decision engine, modified decision-related data (e.g., factors as modified by the user inputs), and decision options (e.g., output of the decision engine 2210). In response to receiving the data, the interface 2301 passes the received data to one of the aforementioned modules as described in more detail herein.

The interface 2301 provides the received data (e.g., user inputs and modified decision-related data) to the retrieving module 2307, which is also provided on the one or more processors. The retrieving module 2307 is configured to retrieve marketing data (e.g., vendor-related data) from a marketing database/engine based on one or more properties of the modified decision-related data (e.g., factors, values associated with the factors based on user inputs, and importance values assigned to the factors based on user inputs).

In an example, the retrieving module 2307 matches at least one factor 232 (see FIGS. 3-4) to at least one vendor factor associated with vendor-related data (e.g., marketing data). A vendor associates vendor factors with the vendor-related data such that an engine (e.g., the connector engine 2305) can utilize the vendor factors as criteria for selecting the vendor-related data. The retrieving module 2307 then obtains the marketing data (e.g., vendor-related data) associated with at least a subset of the matched vendor factors from a marketing database. The matched vendor factors are the same as the factors used by the decision engine as criteria for selecting a decision option (e.g., a product/service of interest to a user). However, in this instance the vendor factors, as stated above, are criteria for selecting the vendor-related data rather than criteria for selecting a decision option.

The retrieving module may select a marketing database that corresponds to a vendor based on whether or not goods and/or services provided by the vendor correspond to the factors used by the decision engine as criteria in selecting a decision option. The retrieving module 2307 then passes the retrieved vendor-related data, modified decision-related data, and the matched vendor factors to the selection module 2309.

The selection module 2309 is provided on the one or more processors. The selection module 2309 is configured to process the modified decision-related data to modify the matched vendor factors. The matched vendor factors are used as criteria by the selection module 2309 for selecting marketing data. For instance, the selection module 2309 applies the user inputs to the matched vendor factors. The selection module 2309 then applies the user inputs to the matched vendor factors. Once the selection module 2309 modifies the matched vendor factors, the selection module 2309 selects a subset of the marketing data (e.g., vendor-related data) based on the matched vendor factors as modified by the user inputs.

The selection module 2309 includes a ranking module 2311 that is configured to rank the selected marketing data by applying weighted factor scores associated with the decision-related data to the matched vendor factors. Based on the ranks, the selection module 2309 selects a subset of the marketing data. In addition, the selection module 2309 may further refine the selection of the subset of the marketing data based on an advertisement subscription of a vendor associated with the marketing data. The selection module 2309 may then provide the selected subset of marketing data to the presenting module 2303.

The presenting module 2309 is configured to provide the marketing data along with the output of the decision engine in a format (e.g., size, corresponding graphics, layout, etc) based on a type of communication device the user is utilizing to communicate over the network 2250. For instance, a laptop/desktop computer may have more resources (e.g., larger displays, memory, processing power) for displaying the decision options and marketing data than, for example, a mobile phone. In an example, the presenting module 2309 determines a type of communication device the user is utilizing based on communication device information received from the interface 2301.

Such communication device information may include information that indicates the resources available to a communications device. For example, the operating system or browser that the communication device is employing to communicate over the network 2250 can provide an indication to the presenting module 2309 regarding the resources available to the user for displaying the marketing data along with the output of the decision engine (e.g., decision options). The presenting module 2303 may extract the information from communication messages (provided by the interface 2301) sent by the user over the network 2250. Alternatively, the presenting module may determine such information based on a format of the decision options output by the decision engine. Based on such communication device information, the presenting module 2309 provides the vendor-related data and decision options in a format that is optimal for displaying such data on the user's communication device.

The interface 2301 then receives the format information from the presenting module 2303 and selected marketing data from the selection module 2309 and i) provides the selected marketing data (in a format determined by the presenting module 2303) to the user, ii) provides the marketing data to a marketing engine as a recommendation of marketing data to provide to the user, and/or iii) triggers the marketing engine to provide the selected marketing data to the user. For example, the interface 2301 may trigger the marketing engine to provide the selected marketing data.

Figure 24C:
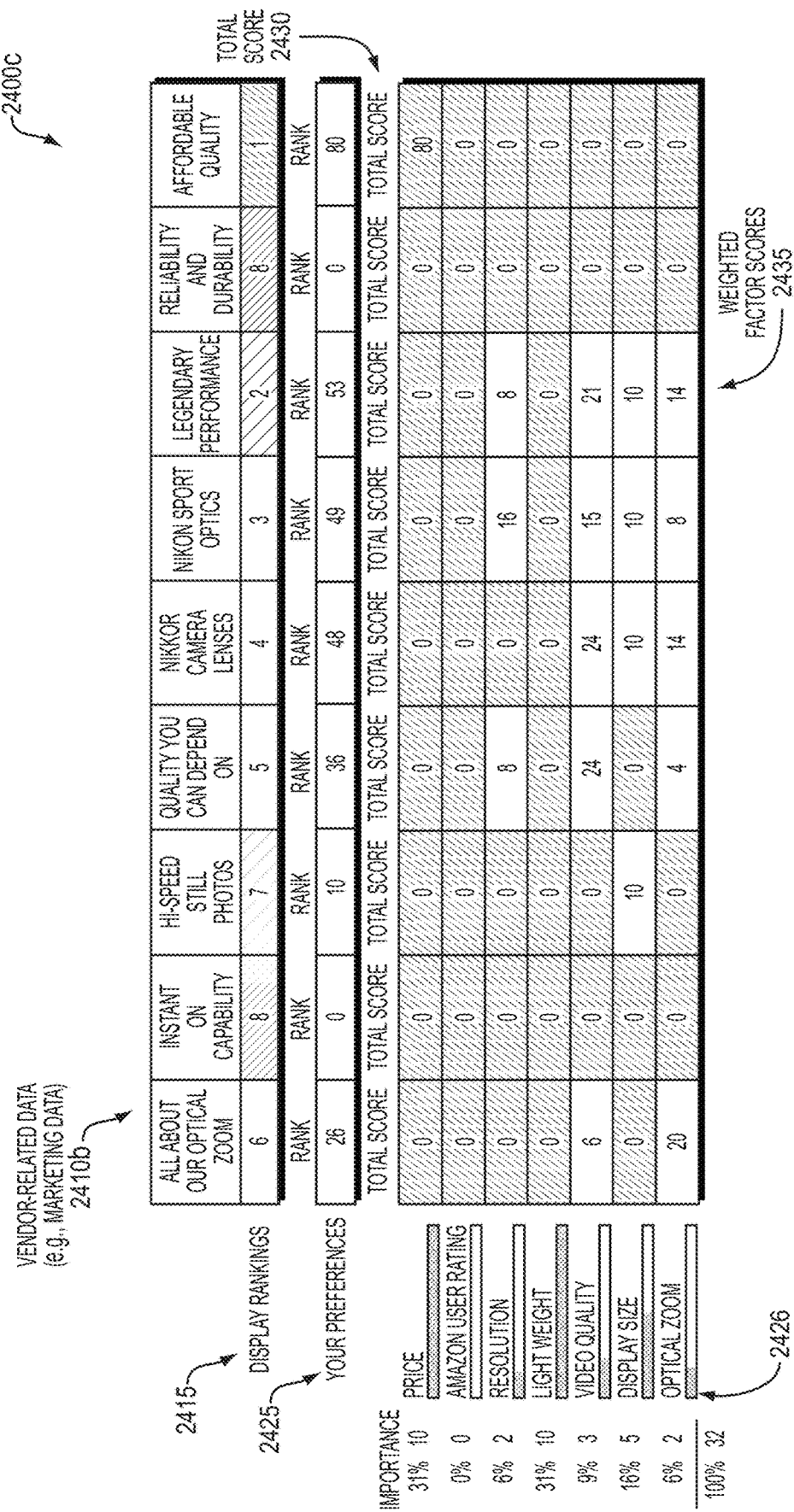

FIGS. 24A-C are graphs illustrating decision logic utilized by a connector engine. As stated above, the connector engine receives modified decision-related data from a decision engine (see FIG. 3). In an example, the modified decision-related data may be factors 232 (see FIG. 3) used as criteria in selecting decision options by the decision engine. The factors 232 (see FIG. 3) may be modified (i.e., modified decision-related data) with importance values 246 (see FIG. 3)(e.g., weights) corresponding to each of the factors 232 (see FIG. 3). As illustrated, the factors 232 (see FIG. 3) are associated with a user's desire to purchase a product (e.g., a camera). The decision engine may use the factors 232 (see FIG. 3) to return at least one decision option (see FIG. 7-9) to a user. It should be known that many other factors/combination of factors may also be utilized by the decision engine.

The connector engine then retrieves marketing data (e.g., vendor-related data) 2410 from a marketing database/engine. In the example illustrated in FIG. 24A, the marketing database/engine stores a table 2400*a* of vendor factors 2426*a* and vendor-related data 2410*a*. For each of the vendor factors 2426, the table 2400*a* includes un-weighted vendor factor scores 2434 corresponding to each of the vendor Options A-D 2410*a* (e.g., vendor-related data). The un-weighted factor scores 2434 may be subjective scores assigned by each vendor based on a marketing campaign initiated by the vendor.

In order to retrieve the marketing data, the connector engine matches the factors 232 (see FIG. 3) with vendor factors 2426 associated with vendor-related data 2410*a*. Based on the results of the matching, the connector engine obtains vendor-related data 2410*b* (see FIG. 24B). For instance, the factors 232 (see FIG. 3) may only match with a subset of the vendor factors 2426*a*. The connector engine then retrieves, as illustrated in FIG. 24B, the matched vendor factors 2426*b*, the vendor-related data 2410*b* associated with at least a subset of the matched vendor factors 2426*b*, and the corresponding un-weighted vendor factor scores 2434*b*.

FIG. 24B illustrates an example table 2400*b* associated with Nikon Advertisements generated by the connector engine in response to retrieving the aforementioned data and receiving the modified decision-related data (see FIG. 3). In addition, the connector engine applies the user inputs (i.e., importance values 246 (see FIG. 3)) to the matched vendor factors 2426*b* to generate weighted vendor factors 2425. The weighted vendor factors 2425 have associated importance values 2427. As illustrated, the vendor-related data 2410*b* and associated un-weighted vendor factor scores 2434 are associated with a single vendor (e.g., Nikon). It should be noted that the connector engine may be performing a similar analysis using a subset of the matched vendor factors 2426*b* with respect to at least one other vendor (e.g., Canon) of a plurality of vendors. In order to select vendor-related data best suited for the user among the plurality of vendors, the connector must normalize the un-weighted factor scores 2434*b*. The connector may utilize any known method of normalization.

Once the un-weighted vendor factor scores 2434*b* are normalized, the connector engine applies weights to each of the normalized un-weighted vendor factor scores. In the current example, the connector engine multiplies the importance values 2427 associated with the weighted vendor factors 2425 by the normalized un-weighted factor scores to obtain weighted factor scores 2435 as illustrated in FIG. 24C. In response to calculating the weighted scores 2435, now referring to FIG. 24C, the connector engine calculates a total score 2430 corresponding to each item of the vendor-related data 2410*b*. For instance, the connector engine calculates the total score 2430 for each item, in this illustrated example, by summing the weighted factor scores for each item of the vendor-related data 2410*b*. Subsequently, the connector engine provides a ranking 2415 to each item of the vendor-related data 2410 based the calculated total scores 2430. In this example, the connector engine assigns the item of the vendor-related data 2410 that has the highest total score with the highest rank.

Figure 24D:
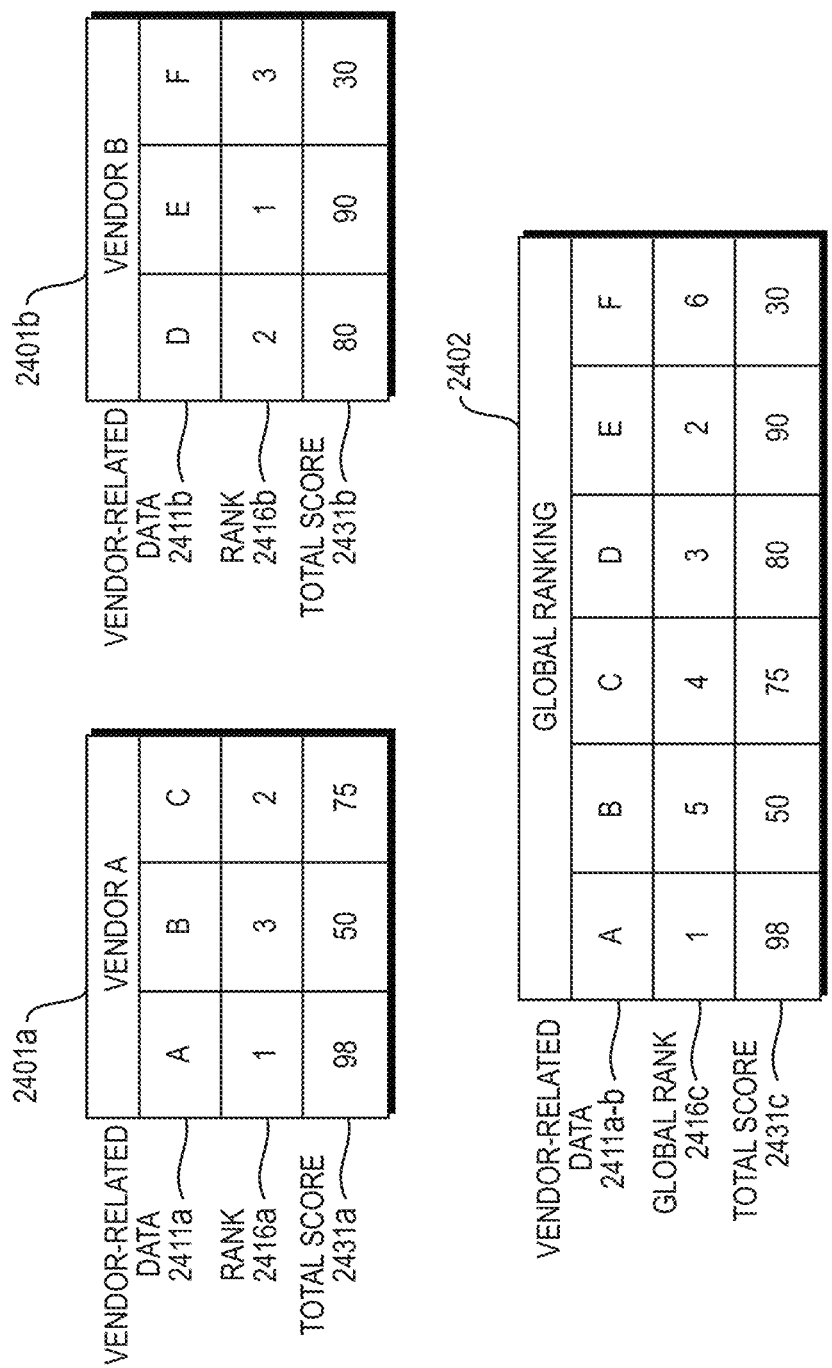

The connector engine may then select a subset of the vendor-related data 2410*b* based on respective rankings. In addition, referring to FIG. 24D, the connector engine may compare the total scores for all items of vendor-related data 2410 for one vendor with respect the total scores for all items of vendor-related data with other vendors. Based on the comparison, the connector engine computes a global ranking score 2416*c* for all vendor-related data associated with a subset of the matched vendor factors 2426*b*. For example, the table 2401*a* is associated with the vendor-related data 2411*a* corresponding to Vendor A. Using the total scores 2431*a*, the connector engine calculates rankings 2416*a* with respect to the vendor-related data 2411*a*. In addition, the table 2401*b* is associated with the vendor-related data 2411*b* corresponding to Vendor B. Using the total scores 2431*b*, the connector engine calculates rankings 2416*b* with respect to the vendor-related data 2411*a*. In one example, the connector engine may create a global ranking table 2402 by comparing the total score 2431*a* from the table 2401*a* to the total score 2431*b* from the table 2401*b*. Based on the comparison, the connector engine creates a global rank 2416*c* of the vendor-related data 2411*a*-*b*.

In another embodiment, the connector engine may create a global ranking table using information associated with an advertisement/marketing subscription service subscribed to by each of the vendors. For example, the connector engine may add a subscription based tier of ranking to the global ranking table 2402. For instance, the connector engine may select a threshold number (e.g., top ten) of the highest ranked ads from the global ranking table 2402. The connector engine may then re-rank the selected ads based on an amount the vendor is willing to pay in response a user's interaction with the vendor's ads (e.g., pay-per-click). In another example, the connector engine may rank and select the ads associated with a vendor based on an amount the vendor is willing to pay in response a user's interaction with the vendor's ads (e.g., pay-per-click).

In an embodiment, a vendor may provide the connector engine with rules. The connector engine uses the rules to select a subset of the vendor-related data. In an example, a vendor may only wish the connector to select vendor-related data associated with the vendor of the data received a score above a certain threshold or a global ranking above a certain threshold.

Figure 25:
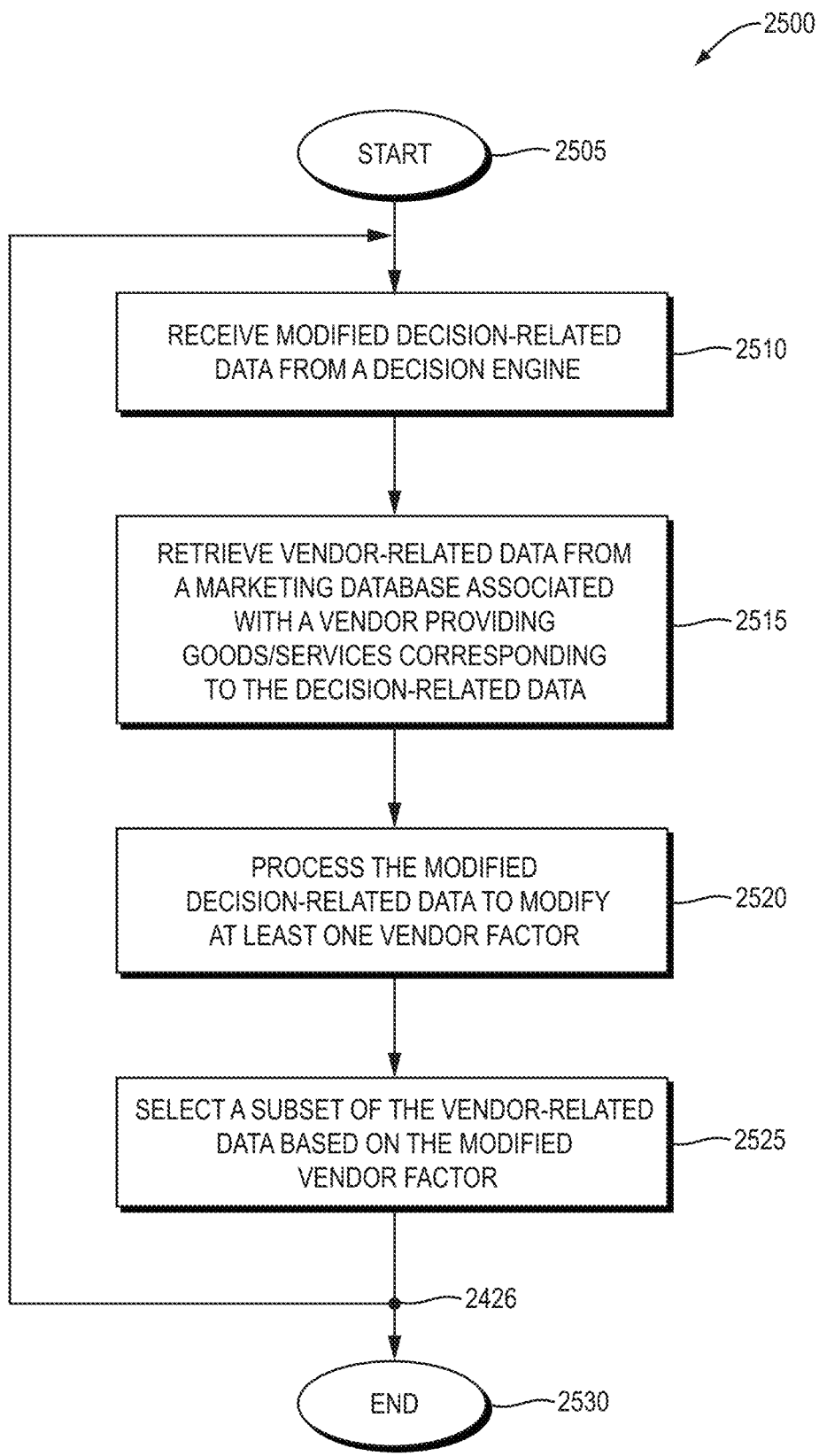
FIG. 25 is a flow diagram of an example method for providing vendor-related data.

FIG. 25 is a flow diagram of an example method 2500 for providing vendor-related data. At 2505, the method 2500 begins. At 2510, a connector engine (e.g., connector engine 2205 of FIG. 22) receives modified decision-related data from a decision engine (e.g., decision engine 2210 of FIG. 22). The received data is associated with a user's interaction with the decision engine during a communications session between the user and the decision engine. The modified decision-related data is generated by a decision engine by applying at least one user input to decision-related data. In particular, the decision-related data is at least one factor used as a criterion in selecting at least one decision option. The at least one decision option is an output of the decision engine in response to the application of the at least one user input to the decision-related data. In an example, the at least one decision option is product and/or service related data. In another example, the modified decision-related data includes at least one factor having a weighted score, where the weighted score of the at least one factor is determined by at least an importance assigned to the at least one factor by the user.

At 2515, the connector engine relieves vendor-related data from a marketing database (e.g., marketing database 2235 of FIG. 22) based on one or more properties of the modified decision-related data. In particular, the connector engine matches the at least one factor to at least one vendor factor associated with the vendor-related data and obtains vendor-related data associated with at least a subset of the at least one vendor factor. The at least one vendor factor is a criterion used in selecting the vendor-related data. In an example, the connector engine retrieves the vendor-related data by selecting the marketing database corresponding to a vendor and retrieving the vendor-related data from the selected at least one marketing database. In another example, the connector engine may select the marketing database corresponding to the vendor by selecting the vendor based on whether or not goods and/or services provided by the vendor correspond to the decision-related data.

The connector engine, at 2520, processes the modified decision-related data to modify the at least one vendor factor. In addition, the connector engine may rank the vendor-related data by applying weighted scores associated with the decision-related data to the vendor factors. At 2525, the connector engine selects a subset of the vendor-related data based on the modified at least one vendor factor. In an example, the connector engine may select the vendor-related data by selecting a subset of the ranked vendor-related data. In another example, the connector engine may select the subset of ranked vendor-related data by selecting the subset based on an advertisement subscription of a vendor associated with the vendor-related data. At 2426, the connector engine determines if a user's communication session with the decision engine has terminated or is about to terminate. If the communication session is still active and the connector engine may repeat the aforementioned actions.

At 2530, if the connector engine determines that the communication session has terminated or is about to terminate, the connector engine may end processing by outputting the selected subset of the vendor-related data based on the modified at least one vendor factor. For instance, the connector engine may i) providing the selected subset of vendor-related data to the user, ii) trigger a marketing engine associated with the marketing database to provide the selected subset of vendor-related data to the user, and/or iii) provide the selected subset of vendor-related data to a marketing engine associated with the marketing database as a recommendation of vendor-related data to provide to the user, where the marketing engine utilizes the recommendation to provide vendor-related data to the user.

In another embodiment, the connector engine may also add an additional tier of ranking that includes factors provided by the connector engine itself. In particular, the connector engine may apply a subscription service factor (e.g., an amount the vendor is willing to pay-per-click). For example, the connector engine may add rank each item of the vendor-related data based on a subscription service elected by the vendor for the specific items (e.g., an amount the vendor is willing to pay-per-click).

Further example embodiments of the present disclosure may be configured using a computer program product; for example, controls may be programmed in software for implementing example embodiments of the present disclosure. Further example embodiments of the present disclosure may include a non-transitory computer readable medium containing instruction that may be executed by a processor, and, when executed, cause the processor to complete methods described herein. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read only memory (CD-ROM), and so forth. In operation, a general purpose or application specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the disclosure.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of comparing a plurality of decision options, said method implemented on a computing device programmable to perform the steps comprising:
    entering a user factor by user entry;
    obtaining the plurality of decision options, using a search engine, by comparing tags associated with each of the plurality of decision options and a plurality of factors including the user factor and an additional factor determined by searching a database;
    calculating a plurality of numeric values, the plurality of numeric values corresponding to a plurality of combinations of each of the plurality of factors and each of the plurality of decision options;
    calculating a plurality of weighted scores for the plurality of numeric values;
    calculating a plurality of total scores for the plurality of decision options using the plurality of weighted scores;
    ranking each of the plurality of decision options based on the plurality of total scores; and
    outputting the plurality of decision options according to the ranking.

2. The method of claim 1, further comprising entering factor data for the plurality of factors.

3. The method of claim 1, further comprising entering an importance level for each of the plurality of factors.

4. The method of claim 3, further comprising calculating the plurality of weighted scores based on the importance level for the factor.

5. The method of claim 1, wherein the plurality of decision options include at least one of a plurality of products or services.

6. The method of claim 1, wherein calculating the plurality of numeric values includes using at least one of polynomial computation, logarithmic computation, power computation, exponential computation, or moving average computation.

7. A computer program embodied on one of non-volatile or volatile media comprising at least one code segment configured to instruct a computer to:
    receive a user factor by user entry including a user;
    obtain a plurality of decision options, using a search engine, by comparing tags associated with each of the plurality of decision options and a plurality of factors including the user factor and an additional factor determined by searching a database;
    calculate a plurality of numeric values, the plurality of numeric values corresponding to a plurality of combinations of each of the plurality of factors and each of the plurality of decision options;
    calculate a plurality of weighted scores for the plurality of numeric values;
    calculate total scores for each of the plurality of decision options using the plurality of weighted scores;
    rank the plurality of decision options based on the total scores for each of the plurality of decisions options; and
    output the plurality of decision options according to the ranking.

8. The computer program of claim 7, wherein the computer program further comprises at least one code segment configured to receive an importance level for each of the plurality of factors.

9. The computer program of claim 8, wherein the computer program further comprises at least one code segment configured to calculate a weighted score for each of the plurality of factors based on the importance level of each factor.

10. The computer program of claim 7, wherein the computer program further comprises at least one code segment configure to receive factor data for each of the plurality of factors.

11. The computer program of claim 7, calculating the plurality of numeric values includes using at least one of polynomial computation, logarithmic computation, power computation, exponential computation, or moving average computation.

12. A decision making system comprising:
    at least one server coupled in communication with at least one first party and at least one second party, the at least one server configured to:
    receive a plurality of factors including a user factor from a user and an additional factor from a database;
    obtain a plurality of decision options, using a search engine, by comparing tags associated with each of the plurality of decision options and the plurality of factors including the user factor;
    calculate a plurality of numeric values for each combination of the plurality of factors and the plurality of decision options;
    calculate a plurality of weighted scores for the plurality of numeric values;
    rank the plurality of decision options based on the plurality of weighted scores; and
    output the plurality of decision options according to the ranking.

13. The system of claim 12, wherein the server is further configured to receive factor data for each of the plurality of factors.

14. The system of claim 12, wherein the server is further configured to determine the plurality of decision options include at least one product or service.

15. The system of claim 12, wherein the server is further configured to receive an importance level of each of the plurality of factors.

16. The system of claim 15, wherein the server is further configured to calculate a weighted score for each factor of the plurality of factors based on the corresponding importance level.

17. The system of claim 12, calculating the plurality of numeric values includes using at least one of polynomial computation, logarithmic computation, power computation, exponential computation, or moving average computation.

* * * * *